(12) United States Patent
Takano

(10) Patent No.: US 10,382,477 B2
(45) Date of Patent: *Aug. 13, 2019

(54) IDENTIFICATION APPARATUS, CONTROL METHOD THEREFOR, AND STORAGE MEDIUM

(71) Applicant: CANON DENSHI KABUSHIKI KAISHA, Chichibu-shi (JP)

(72) Inventor: Kazuki Takano, Iruma-gun (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 131 days.

This patent is subject to a terminal disclaimer.

(21) Appl. No.: 15/281,798

(22) Filed: Sep. 30, 2016

(65) Prior Publication Data

US 2017/0019415 A1 Jan. 19, 2017

Related U.S. Application Data

(63) Continuation of application No. PCT/JP2015/080171, filed on Oct. 27, 2015.

(30) Foreign Application Priority Data

Nov. 5, 2014 (JP) ................. 2014-225422

(51) Int. Cl.
*H04L 29/06* (2006.01)
*G06F 21/56* (2013.01)
*G06F 21/55* (2013.01)

(52) U.S. Cl.
CPC .......... *H04L 63/145* (2013.01); *G06F 21/552* (2013.01); *G06F 21/56* (2013.01); *H04L 63/1408* (2013.01); *H04L 2463/146* (2013.01)

(58) Field of Classification Search
CPC ............... H04L 63/145; H04L 63/1408; H04L 2463/146; H04L 29/06; G06F 21/552; G06F 21/56

(Continued)

(56) References Cited

U.S. PATENT DOCUMENTS 5,787,131 A 7/1998 Bottomley
5,822,533 A 10/1998 Saito et al.
(Continued)

FOREIGN PATENT DOCUMENTS

JP H06-110718 A 4/1994
JP 0944432 A 2/1997
(Continued)

OTHER PUBLICATIONS

Dec. 15, 2015 International Search Report in International Patent Appln. No. PCT/JP2015/080171.

(Continued)

*Primary Examiner* — Abu S Sholeman
(74) *Attorney, Agent, or Firm* — Venable LLP

(57) ABSTRACT

There is provided an identification apparatus. A storage unit stores an operation history as a history of an operation executed in at least one information processing apparatus. An acquisition unit acquires malware spread information including information indicating malware. An identification unit identifies, based on the operation history, an intrusion route of the malware indicated by the malware spread information acquired by the acquisition unit, generates at least one piece of malware spread information corresponding to at least one operation included in the intrusion route in the operation history, and identifies, in the operation history, for each of the at least one piece of malware spread information, at least one operation of spreading the malware (Continued)

by setting, as a direct or indirect start point, the malware indicated by the malware spread information.

15 Claims, 41 Drawing Sheets

(58) Field of Classification Search
USPC .................................................. 72/23; 726/23
See application file for complete search history.

(56) References Cited

U.S. PATENT DOCUMENTS

| | | | |
|---|---|---|---|
| 5,944,783 | A | 8/1999 | Nieten |
| 7,257,841 | B2 | 8/2007 | Naitoh |
| 7,797,335 | B2 * | 9/2010 | Stern ..................... G06F 21/568 |
| | | | 707/713 |
| 8,190,647 | B1 | 5/2012 | Pereira et al. |
| 8,413,244 | B1 | 4/2013 | Nachenberg |
| 9,124,616 | B2 | 9/2015 | Naito et al. |
| 9,332,028 | B2 | 5/2016 | Xaypanya et al. |
| 2002/0138760 | A1 | 9/2002 | Naitoh |
| 2004/0013557 | A1 * | 1/2004 | Morris .................. B22F 1/0059 |
| | | | 419/36 |
| 2004/0044912 | A1 | 3/2004 | Connary et al. |
| 2004/0133557 | A1 | 7/2004 | Wen et al. |
| 2004/0172416 | A1 | 9/2004 | Murakami et al. |
| 2005/0091661 | A1 | 4/2005 | Kurien et al. |
| 2007/0006310 | A1 | 1/2007 | Piccard |
| 2007/0174911 | A1 | 7/2007 | Kronenberg et al. |
| 2007/0250817 | A1 | 10/2007 | Boney |
| 2007/0250818 | A1 | 10/2007 | Boney |
| 2007/0250928 | A1 | 10/2007 | Boney |
| 2008/0240253 | A1 | 10/2008 | Au et al. |
| 2009/0320134 | A1 * | 12/2009 | Corcoran ............... G06F 21/562 |
| | | | 726/24 |
| 2009/0320136 | A1 | 12/2009 | Lambert et al. |
| 2010/0212013 | A1 * | 8/2010 | Kim ........................ H04L 45/00 |
| | | | 726/23 |
| 2011/0029819 | A1 | 2/2011 | Mehta et al. |
| 2011/0032567 | A1 * | 2/2011 | Ishida ..................... G06F 21/56 |
| | | | 358/1.15 |
| 2011/0320508 | A1 * | 12/2011 | Naito .................. G06F 17/3012 |
| | | | 707/827 |
| 2012/0254995 | A1 | 10/2012 | Sallam |
| 2012/0266247 | A1 * | 10/2012 | Guy ....................... G06F 21/577 |
| | | | 726/25 |
| 2013/0312099 | A1 | 11/2013 | Edwards et al. |
| 2014/0115652 | A1 * | 4/2014 | Kapoor ................. G06F 21/554 |
| | | | 726/1 |
| 2014/0189776 | A1 | 7/2014 | Diehl |
| 2014/0351936 | A1 | 11/2014 | Hao |
| 2015/0113647 | A1 * | 4/2015 | Sakamaki ........... H04L 67/1002 |
| | | | 726/23 |
| 2015/0193618 | A1 | 7/2015 | Takano et al. |
| 2015/0220814 | A1 | 8/2015 | Verkasalo et al. |
| 2015/0264062 | A1 * | 9/2015 | Hagiwara ............... G06F 21/56 |
| | | | 726/24 |
| 2017/0374086 | A1 * | 12/2017 | Jeong, II ............. H04L 63/1416 |

FOREIGN PATENT DOCUMENTS

| | | |
|---|---|---|
| JP | 11134190 A | 5/1999 |
| JP | 2002287991 A | 10/2002 |
| JP | 2004086241 A | 3/2004 |
| JP | 2005025378 A | 1/2005 |
| JP | 2008-052570 A | 3/2008 |
| JP | 2009-176132 A | 8/2009 |
| JP | 2012198796 A | 10/2012 |
| WO | 2012/001763 A1 | 1/2012 |
| WO | 2014/087597 A1 | 6/2014 |

OTHER PUBLICATIONS

May 31, 2016 International Preliminary Report on Patentability in International Patent Appln. No. PCT/JP2015/080171.

* cited by examiner

F I G. 3

| TYPE | PC NAME | TIME | OPERATION NAME | SOURCE PATH | DESTINATION PATH | PROCESS ID | HASH VALUE | SIZE |
|---|---|---|---|---|---|---|---|---|
| FILE | PCA | 10:00 | COPY | C:\virus.exe | C:\Windows\virus.exe | — | 856C62AF81D7... | 100kB |
| FILE | PCA | 10:01 | COPY | C:\virus.exe | C:\ProgramFiles\virus.exe | — | 856C62AF81D7... | 100kB |
| PROCESS | PCA | 10:02 | PROCESS ACTIVATION | C:\Windows\virus.exe | — | 1234 | 63E60041A9C30... | 100kB |
| FILE | PCA | 10:03 | RENAME | C:\Windows\System32\virus.exe | C:\Windows\System32\virus.exe | — | 18F58D631C54... | 100kB |

F I G. 4

| TYPE | PC NAME | TIME | PATH | OPERATION NAME | HASH VALUE | SIZE | ID | PARENT ID |
|---|---|---|---|---|---|---|---|---|
| FILE | PCA | 10:00 | C:\virus.exe | COPY | 856C62AF81D7... | 100kB | 1 | — |
| FILE | PCA | 10:05 | C:\ProgramFiles\virus.exe | COPY | 856C62AF81D7... | 100kB | 2 | 1 |
| FILE | PCA | 10:08 | C:\Windows\virus.exe | COPY | 856C62AF81D7... | 100kB | 3 | 1 |
| FILE | PCA | 11:00 | C:\Windows\System32\virus.exe | MOVE | 856C62AF81D7... | 100kB | 4 | 3 |

FIG. 5

| TYPE | PC NAME | TIME | PATH | ID | PARENT ID |
|---|---|---|---|---|---|
| REGISTRY | PCA | 10:00 | HKEY_LOCAL_MACHINE\SYSTEM\CurrentControlSet\services\Virus | 1 | — |
| REGISTRY | PCA | 10:01 | HKEY_CURRENT_USER\ControlPanel\Infrared\FileTransfer\Virus | 2 | 1 |
| REGISTRY | PCA | 10:02 | HKEY_LOCAL_MACHINE\SOFTWARE\Virus | 3 | 2 |

FIG. 6

| TYPE | PC NAME | TIME | ADDRESS | PATH (PIPE NAME) | ID | PARENT ID |
|---|---|---|---|---|---|---|
| SHARED MEMORY | PCA | 10:00 | 0x0000000F | Pipe1 | 1 | — |
| SHARED MEMORY | PCA | 10:01 | 0x000000FF | Pipe2 | 2 | 2 |

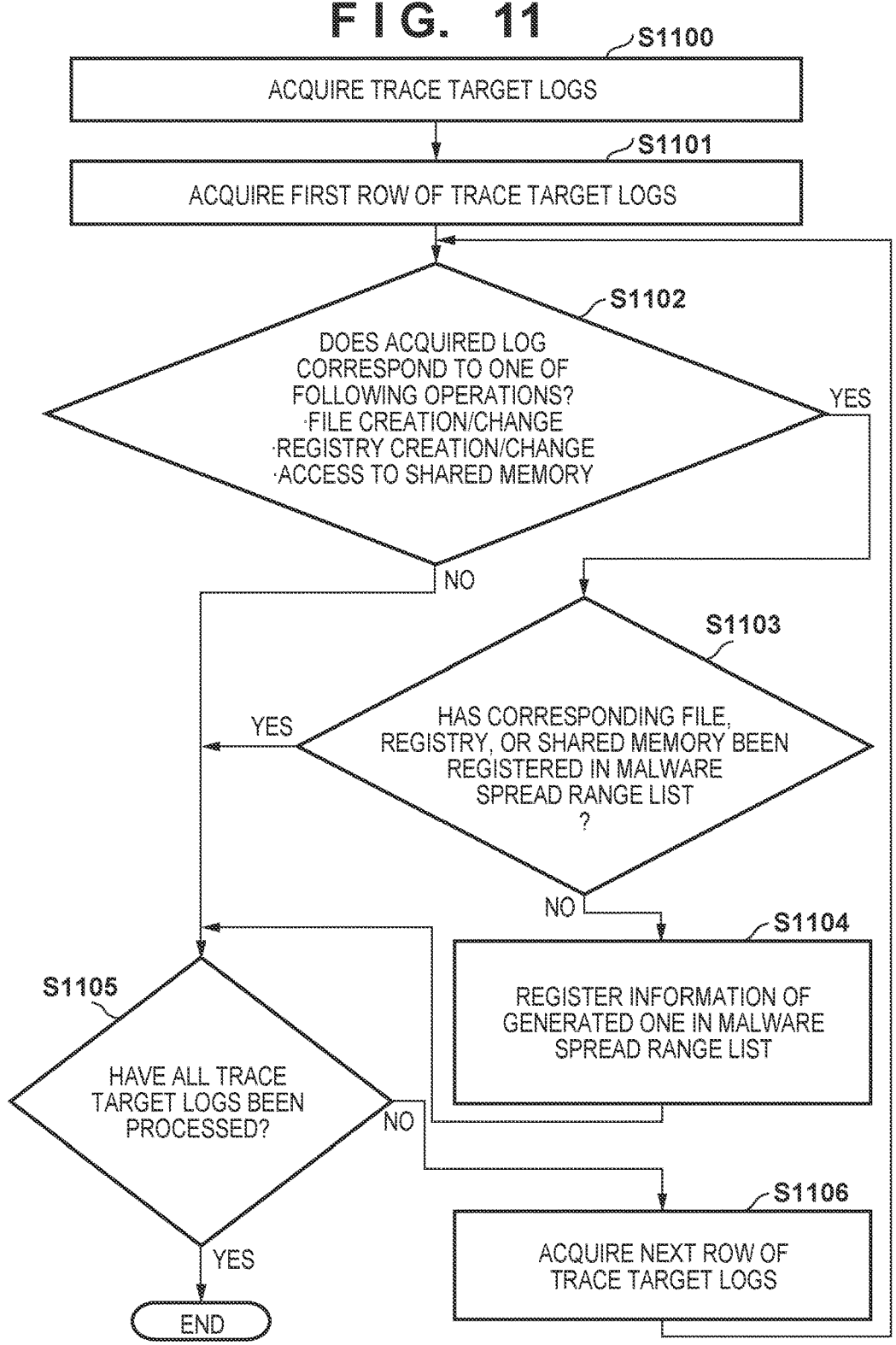

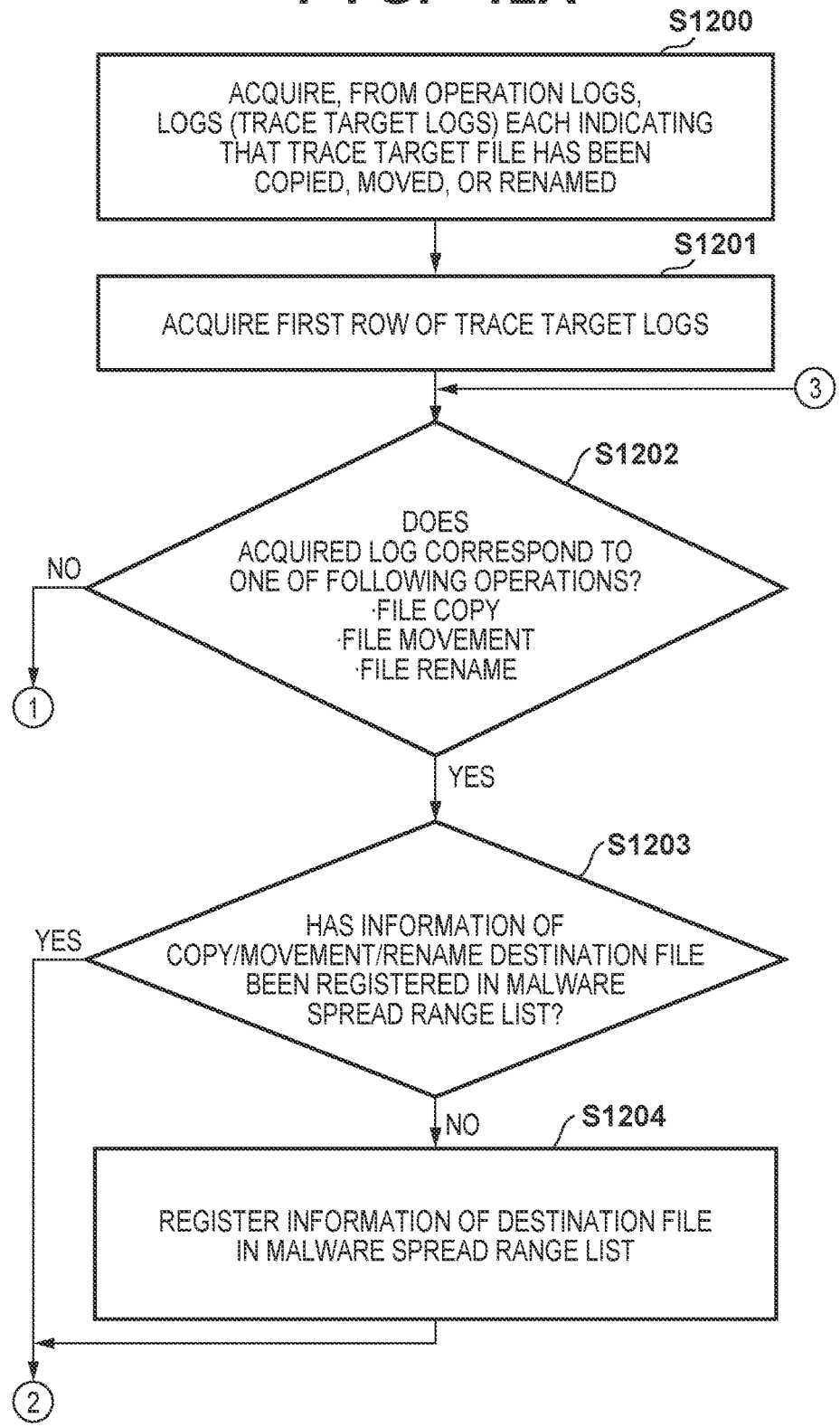

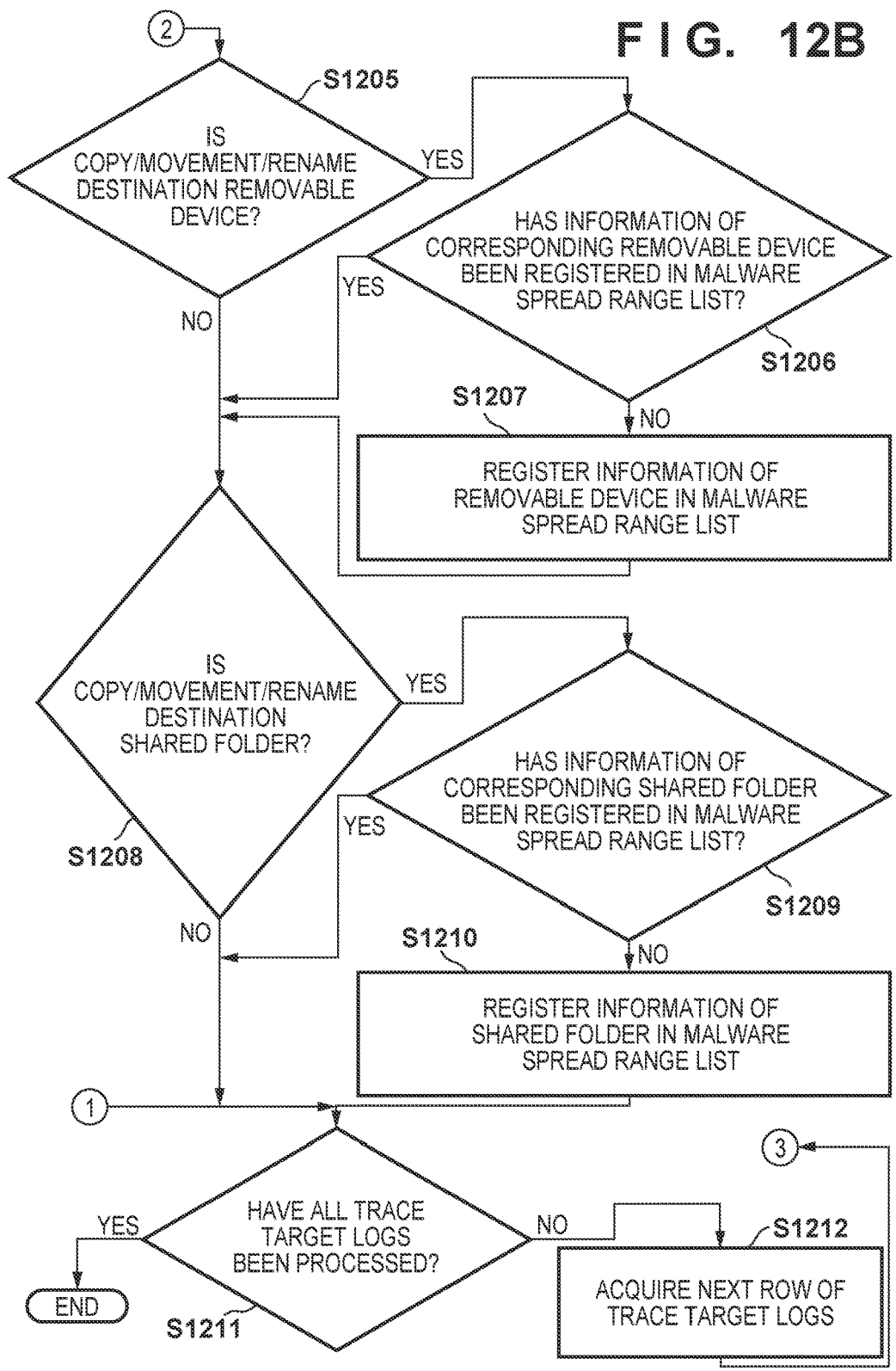

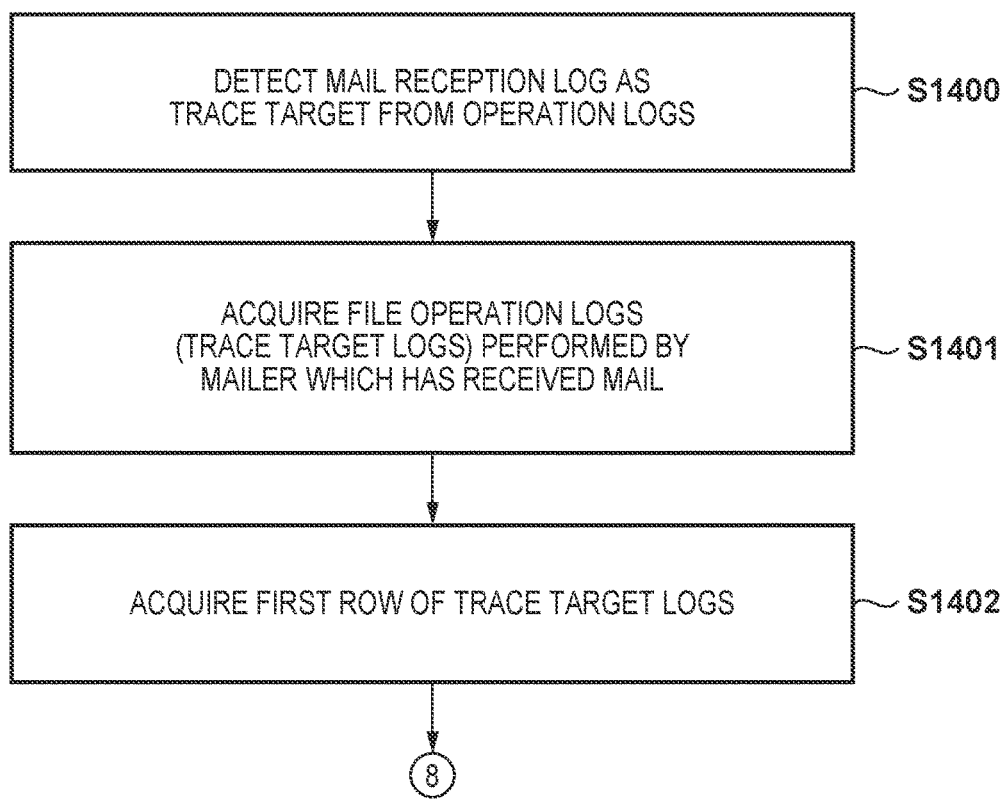
F I G. 14A

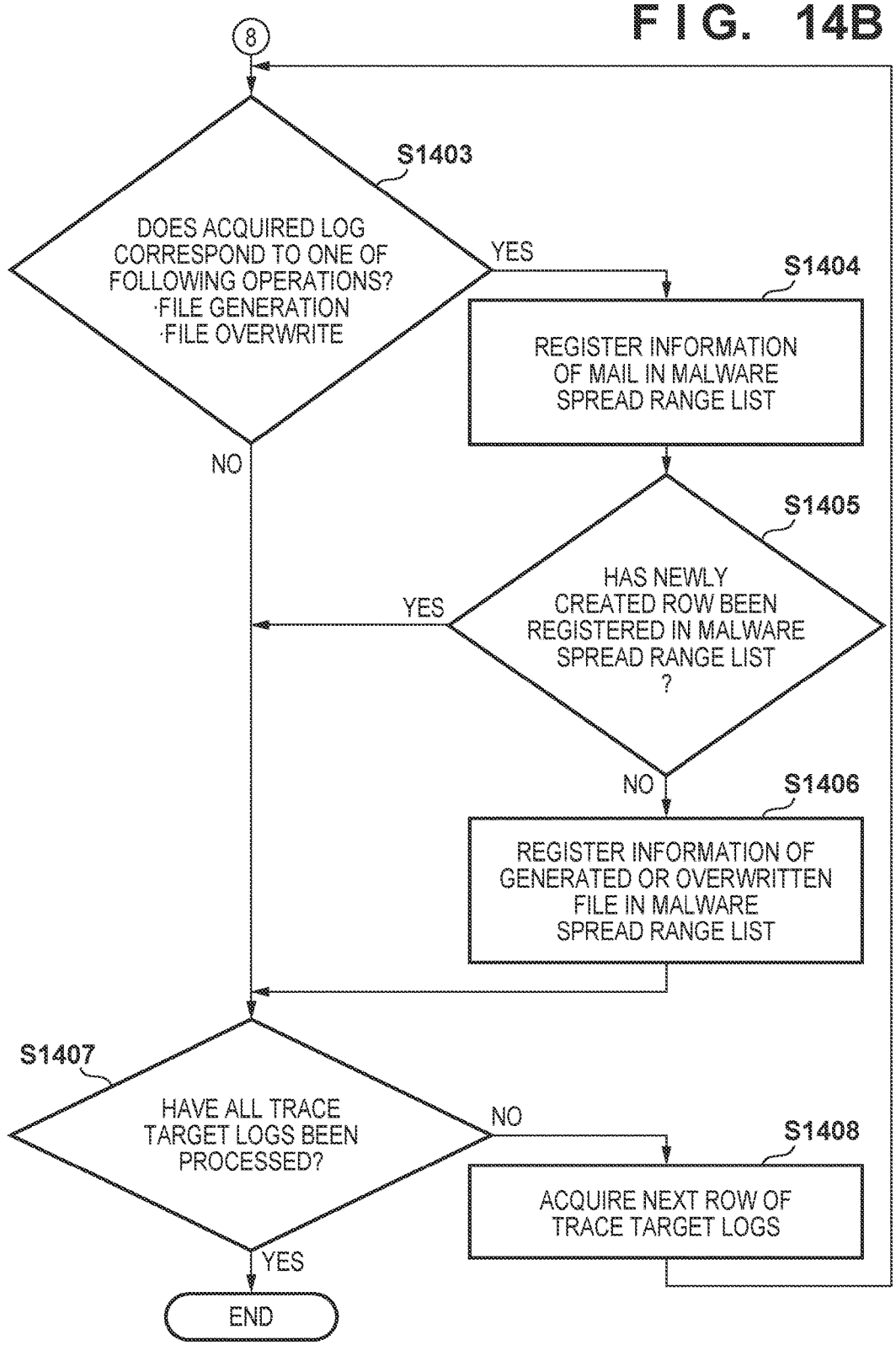

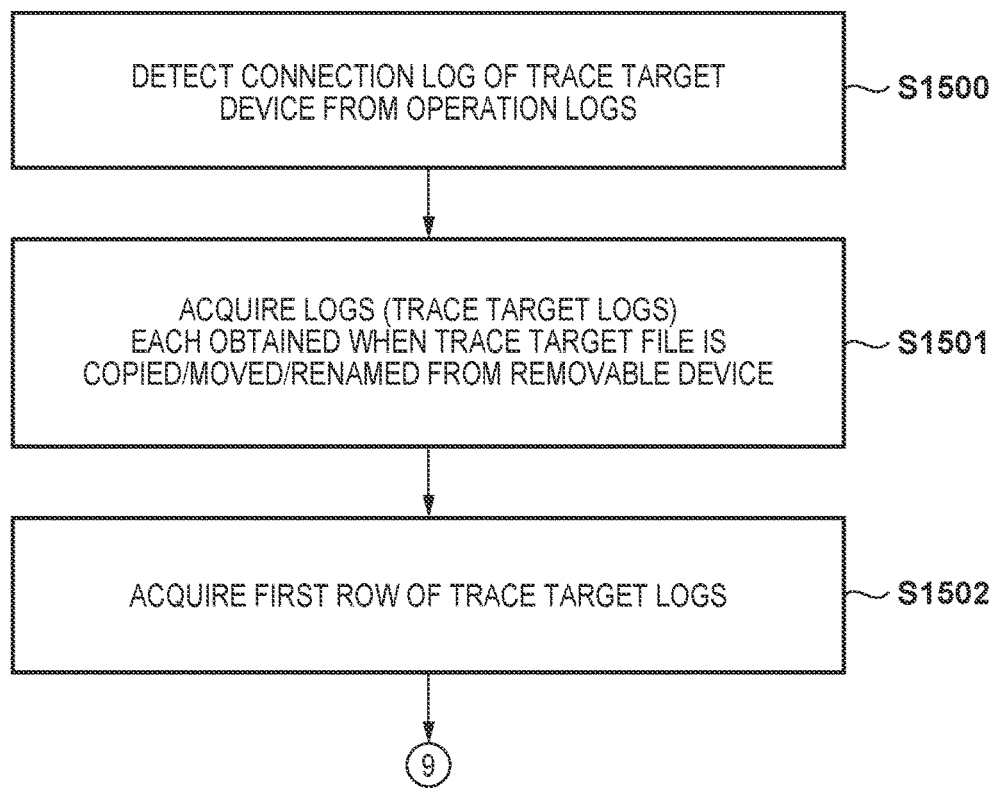
F I G. 15A

F I G. 17

| PC NAME | TIME | OPERATION NAME | SOURCE PATH | DESTI- NATION PATH | PROCESS NAME | PARENT PROCESS NAME | PROCESS ID | PARENT PROCESS ID |
|---|---|---|---|---|---|---|---|---|
| PCA | 10:00 | ACTIVATION | C:\Dir1\Malware.exe | — | Malware.exe | Explorer | 5678 | 9999 |
| PCA | 10:01 | CREATION | C:\Dir1\A.txt | — | Malware.exe | — | 5678 | — |
| PCA | 10:02 | ACTIVATION | C:\Dir1\Editor.exe | — | Editor.exe | Explorer | 1234 | 9999 |
| PCA | 10:02 | LOAD | C:\Dir1\Malware.exe | — | Editor.exe | — | 1234 | — |
| PCA | 10:03 | MALWARE DETECTION | C:\Dir1\A.txt | — | — | — | — | — |
| PCA | 10:10 | CREATION | C:\Dir2\B.txt | — | Editor.exe | — | 1234 | — |
| PCA | 11:00 | ACTIVATION | C:\Programs\Editor2.exe | — | Editor2.exe | Malware.exe | 2345 | 5678 |
| PCA | 11:01 | CREATION | C:\Programs\C.txt | — | Editor2.exe | — | 2345 | — |
| PCA | 11:10 | END | C:\Programs\Editor2.exe | — | Editor2.exe | Malware.exe | 2345 | 5678 |
| PCA | 11:11 | END | C:\Dir1\Editor.exe | — | Editor.exe | Explorer | 1234 | 9999 |
| PCA | 11:12 | END | C:\Dir1\Malware.exe | — | Malware.exe | Explorer | 5678 | 9999 |

F I G. 18

| TYPE | PC NAME | TIME | PATH | OPERATION NAME | ID | PARENT ID |
|---|---|---|---|---|---|---|
| FILE | PCA | 10:00 | C:\Dir1\Malware.exe | ACTIVATION | 1 | — |
| FILE | PCA | 10:01 | C:\Dir1\A.txt | CREATION | 2 | 1 |
| FILE | PCA | 10:03 | C:\Dir1\A.txt | MALWARE DETECTION | 3 | 2 |

FIG. 19

| PC NAME | TIME | OPERATION NAME | SOURCE PATH | SOURCE DEVICE TYPE | DESTINATION PATH | DESTINATION DEVICE TYPE | PROCESS NAME | PROCESS ID |
|---|---|---|---|---|---|---|---|---|
| PCA | 10:00 | CREATION | C:\Dir1\Malware.exe | Local | – | – | Browser | 5678 |
| PCA | 10:01 | RENAME | C:\Dir1\Malware.exe | Local | C:\Dir1\A.exe | Local | Explorer | 1234 |
| PCA | 10:02 | COPY | C:\Dir1\A.exe | Local | C:\Dir2\A.exe | Local | Explorer | 1234 |
| PCA | 10:02 | COPY | C:\Dir1\A.exe | Local | C:\Dir3\A.exe | Local | Explorer | 1234 |
| PCA | 10:03 | MALWARE DETECTION | C:\Dir3\A.exe | – | – | – | A.exe | 9876 |
| PCA | 10:10 | COPY | C:\Dir2\A.exe | Local | C:\Dir4\A.exe | Local | Explorer | 1234 |

FIG. 20

| TYPE | PC NAME | TIME | PATH | OPERATION NAME | ID | PARENT ID |
|---|---|---|---|---|---|---|
| FILE | PCA | 10:00 | C:\Dir1\Malware.exe | CREATION | 1 | — |
| FILE | PCA | 10:01 | C:\Dir1\A.exe | RENAME | 2 | 1 |
| FILE | PCA | 10:02 | C:\Dir3\A.exe | COPY | 3 | 2 |
| FILE | PCA | 10:03 | C:\Dir3\A.exe | MALWARE DETECTION | 4 | 3 |

F I G. 21

| PC NAME | TIME | OPERATION NAME | SOURCE PATH | DESTINATION PATH | URL | PROCESS NAME | PROCESS ID |
|---|---|---|---|---|---|---|---|
| PCA | 9:50 | WEB ACCESS | — | — | http://example.com | Browser | 5678 |
| PCA | 9:58 | CREATION | C:\Dir1\Malware.exe | — | — | Browser | 5678 |
| PCA | 10:00 | WEB ACCESS | — | — | http://example.org | Browser | 5678 |
| PCA | 10:01 | CREATION | C:\Dir1\B.exe | — | — | Browser | 5678 |
| PCA | 10:03 | MALWARE DETECTION | C:\Dir1\Malware.exe | — | — | Malware.exe | 9876 |
| PCB | 13:00 | WEB ACCESS | — | — | http://example.com | Browser | 3456 |
| PCB | 13:01 | CREATION | C:\Dir2\Malware.exe | — | — | Browser | 3456 |
| PCB | 13:02 | WEB ACCESS | — | — | http://example.org | Browser | 3456 |
| PCB | 13:03 | CREATION | C:\Dir2\C.exe | — | — | Browser | 3456 |

F I G. 22

| TYPE | PC NAME | TIME | PATH | URL | OPERATION NAME | ID | PARENT ID |
|---|---|---|---|---|---|---|---|
| Web | PCA | 9:50 | — | http://example.com | WEB ACCESS | 1 | — |
| FILE | PCA | 9:58 | C:\Dir1\Malware.exe | — | CREATION | 2 | 1 |
| FILE | PCA | 10:03 | C:\Dir1\Malware.exe | — | MALWARE DETECTION | 3 | 2 |

F I G. 23

| PC NAME | TIME | OPERATION NAME | SOURCE PATH | ATTACHED FILE NAME | MAIL ADDRESS | MESSAGE ID | PROCESS NAME | PROCESS ID |
|---|---|---|---|---|---|---|---|---|
| PCA | 9:50 | MAIL RECEPTION | - | abcd.pdf | a@example.com | ABCDEFG | Mail | 5678 |
| PCA | 10:00 | CREATION | C:\Dir1\abcd.pdf | - | - | - | Mail | 5678 |
| PCA | 10:03 | MALWARE DETECTION | C:\Dir1\abcd.pdf | - | - | - | abcd.pdf | 9876 |
| PCB | 13:00 | MAIL RECEPTION | - | abcd.pdf | a@example.com | ABCDEFG | Mail2 | 2345 |
| PCB | 13:01 | CREATION | D:\Dir2\abcd.pdf | - | - | - | Mail2 | 2345 |

FIG. 24

| TYPE | PC NAME | TIME | PATH | MAIL ADDRESS | MESSAGE ID | ATTACHED FILE NAME | OPERATION NAME | ID | PARENT ID |
|------|---------|------|------|--------------|------------|--------------------|----------------|----|-----------|
| MAIL | PCA | 9:50 | - | a@example.com | ABCDEFG | abcd.pdf | MAIL RECEPTION | 1 | - |
| FILE | PCA | 10:00 | C:\Dir1\abcd.pdf | - | - | - | CREATION | 2 | 1 |
| FILE | PCA | 10:03 | C:\Dir1\abcd.pdf | - | - | - | MALWARE DETECTION | 3 | 2 |

F I G. 25

| PC NAME | TIME | OPERATION NAME | SOURCE PATH | SOURCE DEVICE TYPE | DESTINATION PATH | DESTINATION DEVICE TYPE | DRIVE LETTER | PROCESS NAME | PROCESS ID | SERIAL ID | VENDOR ID | PRODUCT ID |
|---|---|---|---|---|---|---|---|---|---|---|---|---|
| PCA | 10:00 | CREATION | C:\Dir1\Malware.exe | Local | — | — | — | Browser | 5678 | — | — | — |
| PCA | 10:01 | RENAME | C:\Dir1\Malware.exe | Local | C:\Dir1\A.exe | Local | — | Explorer | 1234 | — | — | — |
| PCA | 10:01 | ATTACH | — | — | — | Removable | F: | — | — | AAAAA | BBBBB | CCCCC |
| PCA | 10:02 | COPY | C:\Dir1\A.exe | Local | F:\A.exe | Removable | — | Explorer | 1234 | — | — | — |
| PCA | 10:02 | COPY | C:\Dir1\A.exe | Local | C:\Dir3\A.exe | Local | — | Explorer | 1234 | — | — | — |
| PCA | 10:03 | MALWARE DETECTION | C:\Dir3\A.exe | — | — | — | — | A.exe | 9876 | — | — | — |
| PCA | 10:30 | DETACH | — | — | — | — | F: | — | — | AAAAA | BBBBB | CCCCC |
| PCB | 12:00 | ATTACH | — | — | — | — | G: | — | — | AAAAA | BBBBB | CCCCC |
| PCB | 12:05 | COPY | G:\A.exe | Removable | C:\Local\A.exe | Local | — | Explorer | 4321 | — | — | — |

FIG. 26

| TYPE | PC NAME | TIME | PATH | OPERATION NAME | SERIAL ID | VENDOR ID | PRODUCT ID | ID | PARENT ID |
|---|---|---|---|---|---|---|---|---|---|
| FILE | PCA | 10:00 | C:\Dir1\Malware.exe | CREATION | — | — | — | 1 | — |
| FILE | PCA | 10:01 | C:\Dir1\A.exe | RENAME | — | — | — | 2 | 1 |
| FILE | PCA | 10:02 | C:\Dir3\A.exe | COPY | — | — | — | 3 | 2 |
| FILE | PCA | 10:03 | C:\Dir3\A.exe | MALWARE DETECTION | — | — | — | 4 | 3 |
| FILE | PCA | 10:02 | F:\A.exe | COPY | — | — | — | 5 | 2 |
| REMOVABLE DEVICE (OUTLET) | PCA | 10:02 | F:\A.exe | — | AAAAA | BBBBB | CCCCC | 6 | 5 |

F I G. 27

| TYPE | PC NAME | TIME | PATH | OPERATION NAME | SERIAL ID | VENDOR ID | PRODUCT ID | ID | PARENT ID |
|---|---|---|---|---|---|---|---|---|---|
| FILE | PCA | 10:00 | C:\Dir1\Malware.exe | CREATION | — | — | — | 1 | — |
| FILE | PCA | 10:01 | C:\Dir1\A.exe | RENAME | — | — | — | 2 | 1 |
| FILE | PCA | 10:02 | C:\Dir3\A.exe | COPY | — | — | — | 3 | 2 |
| FILE | PCA | 10:03 | C:\Dir3\A.exe | MALWARE DETECTION | — | — | — | 4 | 3 |
| FILE | PCA | 10:02 | F:\A.exe | COPY | — | — | — | 5 | 2 |
| REMOVABLE DEVICE (OUTLET) | PCA | 10:02 | F:\A.exe | — | AAAAA | BBBBB | CCCCC | 6 | 5 |
| REMOVABLE DEVICE (INLET) | PCB | 12:00 | G:\A.exe | — | AAAAA | BBBBB | CCCCC | 7 | 6 |
| FILE | PCB | 12:05 | C:\Local\A.exe | COPY | — | — | — | 8 | 7 |

F I G. 28

| PC NAME | TIME | OPERATION NAME | SOURCE PATH | SOURCE DEVICE TYPE | DESTINATION PATH | DESTINATION DEVICE TYPE | PROCESS NAME | PROCESS ID |
|---|---|---|---|---|---|---|---|---|
| PCA | 10:00 | CREATION | C:\Dir1\Malware.exe | Local | — | — | Browser | 5678 |
| PCA | 10:01 | RENAME | C:\Dir1\Malware.exe | Local | C:\Dir1\A.exe | Local | Explorer | 1234 |
| PCA | 10:02 | COPY | C:\Dir1\A.exe | Local | \\PCB\share\A.exe | Remote | Explorer | 1234 |
| PCA | 10:02 | COPY | C:\Dir1\A.exe | Local | C:\Dir3\A.exe | Local | Explorer | 1234 |
| PCA | 10:03 | MALWARE DETECTION | C:\share\A.exe | — | — | — | A.exe | 9876 |
| PCB | 10:02 | SHARED LOG | C:\share\A.exe | Local | — | — | — | — |
| PCB | 10:05 | COPY | C:\share\A.exe | Local | D:\Dir10\A.exe | Local | Explorer | 1111 |
| PCC | 12:00 | COPY | \\PCB\share\A.exe | Remote | C:\temp\A.exe | Local | Explorer | 2222 |

FIG. 29

| TYPE | PC NAME | TIME | PATH | OPERATION NAME | ID | PARENT ID |
|---|---|---|---|---|---|---|
| FILE | PCA | 10:00 | C:\Dir1\Malware.exe | CREATION | 1 | — |
| FILE | PCA | 10:01 | C:\Dir1\A.exe | RENAME | 2 | 1 |
| FILE | PCA | 10:02 | C:\Dir3\A.exe | COPY | 3 | 2 |
| FILE | PCA | 10:03 | C:\Dir3\A.exe | MALWARE DETECTION | 4 | 3 |
| FILE | PCA | 10:02 | \\PCB\share\A.exe | COPY | 5 | 2 |
| SHARING (OUTLET) | PCA | 10:02 | \\PCB\share\A.exe | — | 6 | 5 |

F I G. 30

| TYPE | PC NAME | TIME | PATH | OPERATION NAME | ID | PARENT ID |
|---|---|---|---|---|---|---|
| FILE | PCA | 10:00 | C:\Dir1\Malware.exe | CREATION | 1 | — |
| FILE | PCA | 10:01 | C:\Dir1\A.exe | RENAME | 2 | 1 |
| FILE | PCA | 10:02 | C:\Dir3\A.exe | COPY | 3 | 2 |
| FILE | PCA | 10:03 | C:\Dir3\A.exe | MALWARE DETECTION | 4 | 3 |
| FILE | PCA | 10:02 | \\PCB\share\A.exe | COPY | 5 | 2 |
| SHARING (OUTLET) | PCA | 10:02 | \\PCB\share\A.exe | — | 6 | 5 |
| SHARING (INLET) | PCC | 10:02 | \\PCB\share\A.exe | — | 7 | 6 |
| FILE | PCC | 12:00 | C:\temp\A.exe | COPY | 8 | 7 |
| SHARING (INLET) | PCB | 10:02 | C:\share\A.exe | — | 9 | 6 |
| FILE | PCB | 10:05 | D:\Dir10\A.exe | COPY | 10 | 9 |

FIG. 31A

| FIG.31 |
|--------|
| FIG.31A |
| FIG.31B |

| TYPE | PC NAME | TIME | PATH | URL | MAIL ADDRESS | MESSAGE ID | ATTACHED FILE NAME | OPERATION NAME | SERIAL ID | VENDOR ID | PRODUCT ID | ID | PARENT ID |
|---|---|---|---|---|---|---|---|---|---|---|---|---|---|
| Web | PCA | 9:59:00 | --- | http://example.com | --- | --- | --- | WEB ACCESS | --- | --- | --- | 1 | --- |
| FILE | PCA | 10:00:00 | C:\Dir1\Malware.exe | --- | --- | --- | --- | CREATION | --- | --- | --- | 2 | 1 |
| FILE | PCA | 10:01:00 | E:\Malware.exe | --- | --- | --- | --- | COPY | --- | --- | --- | 3 | 2 |
| REMOVABLE DEVICE (OUTLET) | PCA | 10:01:00 | E:\Malware.exe | --- | --- | --- | --- | --- | AAAAA | BBBBB | CCCCC | 4 | 3 |
| REMOVABLE DEVICE (INLET) | PCB | 10:10:00 | F:\Malware.exe | --- | --- | --- | --- | --- | AAAAA | BBBBB | CCCCC | 5 | 4 |
| FILE | PCB | 10:11:00 | \\PCC\share\Malware.exe | --- | --- | --- | --- | COPY | --- | --- | --- | 6 | 5 |
| SHARING (OUTLET) | PCB | 10:11:00 | \\PCC\share\Malware.exe | --- | --- | --- | --- | --- | --- | --- | --- | 7 | 6 |
| SHARING (INLET) | PCC | 10:11:00 | \\PCC\share\Malware.exe | --- | --- | --- | --- | --- | --- | --- | --- | 8 | 7 |
| FILE | PCC | 10:12:00 | H:\Malware.exe | --- | --- | --- | --- | COPY | --- | --- | --- | 9 | 8 |
| REMOVABLE DEVICE (OUTLET) | PCC | 10:12:00 | H:\Malware.exe | --- | --- | --- | --- | --- | DDDDD | EEEEE | FFFFF | 10 | 9 |
| REMOVABLE DEVICE (INLET) | PCD | 10:20:00 | G:\Malware.exe | --- | --- | --- | --- | --- | DDDDD | EEEEE | FFFFF | 11 | 10 |
| FILE | PCD | 10:21:00 | C:\Dir2\Malware.exe | --- | --- | --- | --- | COPY | --- | --- | --- | 12 | 11 |
| FILE | PCD | 10:21:00 | C:\Dir2\Malware.exe | --- | --- | --- | --- | MALWARE DETECTION | --- | --- | --- | 13 | 12 |

FIG. 31B

| | | | | | | | | | | | |
|---|---|---|---|---|---|---|---|---|---|---|---|
| FILE | PCB | 10:30:00 | \\PCG\share\Malware.exe | --- | --- | --- | COPY | --- | --- | --- | 14 | 5 |
| SHARING (OUTLET) | PCB | 10:30:00 | \\PCG\share\Malware.exe | --- | --- | --- | --- | --- | --- | --- | 15 | 14 |
| SHARING (INLET) | PCG | 10:30:00 | \\PCG\share\Malware.exe | --- | --- | --- | --- | --- | --- | --- | 16 | 15 |
| FILE | PCG | 10:41:00 | K:\Malware.exe | --- | --- | --- | COPY | --- | --- | --- | 17 | 16 |
| REMOVABLE DEVICE (OUTLET) | PCG | 10:41:00 | K:\Malware.exe | --- | --- | --- | --- | KKKKK | LLLLL | MMMMM | 18 | 17 |
| REMOVABLE DEVICE (INLET) | PCH | 10:51:00 | L:\Malware.exe | --- | --- | --- | --- | KKKKK | LLLLL | MMMMM | 19 | 18 |
| FILE | PCH | 10:52:00 | C:\Dir3\Malware.exe | --- | --- | --- | COPY | --- | --- | --- | 20 | 19 |
| FILE | PCB | 10:50:00 | I:\Malware.exe | --- | --- | --- | COPY | --- | --- | --- | 21 | 5 |
| REMOVABLE DEVICE (OUTLET) | PCB | 10:50:00 | I:\Malware.exe | --- | --- | --- | --- | HHHHH | IIIII | JJJJJ | 22 | 21 |
| REMOVABLE DEVICE (INLET) | PCE | 10:51:00 | J:\Malware.exe | --- | --- | --- | --- | HHHHH | IIIII | JJJJJ | 23 | 22 |
| FILE | PCE | 10:52:00 | C:\Local Dir2\Malware.exe | --- | --- | --- | COPY | --- | --- | --- | 24 | 23 |
| MAIL | PCE | 11:00:00 | --- | user-f@example.co.jp | HIJKLMN | Malware.exe | MAIL TRANSMISSION | --- | --- | --- | 25 | 24 |
| MAIL | PCF | 11:00:00 | --- | user-f@example.co.jp | HIJKLMN | Malware.exe | MAIL RECEPTION | --- | --- | --- | 26 | 25 |
| FILE | PCF | 11:01:00 | C:\Dir4\Malware.exe | --- | --- | --- | COPY | --- | --- | --- | 27 | 26 |

F I G. 33

| TYPE | PC NAME | TIME | PATH | OPERATION NAME | PROCESS NAME | PARENT PROCESS NAME | PROCESS ID | PARENT PROCESS ID | ID | PARENT ID |
|---|---|---|---|---|---|---|---|---|---|---|
| FILE | PCA | 10:00 | C:\Dir1\Malware.exe | ACTIVATION | Malware.exe | Explorer | 5678 | 9999 | 1 | — |
| FILE | PCA | 10:01 | C:\Dir1\A.txt | CREATION | Malware.exe | — | 5678 | — | 2 | 1 |
| FILE | PCA | 10:03 | C:\Dir1\A.txt | MALWARE DETECTION | — | — | — | — | 3 | 2 |
| FILE | PCA | 10:02 | C:\Dir1\Malware.exe | LOAD | Editor.exe | — | 1234 | — | 4 | 1 |
| FILE | PCA | 10:10 | C:\Dir2\B.txt | CREATION | Editor.exe | — | 1234 | — | 5 | 4 |
| FILE | PCA | 11:00 | C:\Programs\Editor2.exe | ACTIVATION | Editor2.exe | Malware.exe | 2345 | 5678 | 6 | 1 |
| FILE | PCA | 11:01 | C:\Programs\C.txt | CREATION | Editor2.exe | — | 2345 | — | 7 | 6 |

F I G. 34

| TYPE | PC NAME | TIME | PATH | OPERATION NAME | ID | PARENT ID |
|---|---|---|---|---|---|---|
| FILE | PCA | 10:00 | C:\Dir1\Malware.exe | ACTIVATION | 1 | — |
| FILE | PCA | 10:01 | C:\Dir1\A.exe | RENAME | 2 | 1 |
| FILE | PCA | 10:02 | C:\Dir3\A.exe | COPY | 3 | 2 |
| FILE | PCA | 10:03 | C:\Dir3\A.exe | MALWARE DETECTION | 4 | 3 |
| FILE | PCA | 10:02 | C:\Dir2\A.exe | COPY | 5 | 2 |
| FILE | PCA | 10:10 | C:\Dir4\A.exe | COPY | 6 | 5 |

F I G. 35

| TYPE | PC NAME | TIME | PATH | URL | OPERATION NAME | ID | PARENT ID |
|---|---|---|---|---|---|---|---|
| Web | PCA | 9:50 | — | http://example.com | WEB ACCESS | 1 | — |
| FILE | PCA | 9:58 | C:\Dir1\Malware.exe | — | CREATION | 2 | 1 |
| FILE | PCA | 10:03 | C:\Dir1\Malware.exe | — | MALWARE DETECTION | 3 | 2 |
| Web | PCB | 13:00 | — | http://example.com | WEB ACCESS | 4 | 1 |
| FILE | PCB | 13:01 | C:\Dir2\Malware.exe | — | CREATION | 5 | 4 |

FIG. 36

| TYPE | PC NAME | TIME | PATH | MAIL ADDRESS | MESSAGE ID | ATTACHED FILE NAME | OPERATION NAME | ID | PARENT ID |
|---|---|---|---|---|---|---|---|---|---|
| MAIL | PCA | 9:50 | — | a@example.com | ABCDEFG | abcd.pdf | MAIL RECEPTION | 1 | — |
| FILE | PCA | 10:00 | C:\Dir\abcd.pdf | | | | CREATION | 2 | 1 |
| FILE | PCA | 10:03 | C:\Dir\abcd.pdf | | | | MALWARE DETECTION | 3 | 2 |
| MAIL | PCB | 13:00 | — | a@example.com | ABCDEFG | abcd.pdf | MAIL RECEPTION | 4 | 1 |
| FILE | PCB | 13:01 | C:\Dir2\abcd.pdf | | | | CREATION | 5 | 4 |

IDENTIFICATION APPARATUS, CONTROL METHOD THEREFOR, AND STORAGE MEDIUM

This application is a continuation of International Patent Application No. PCT/JP2015/080171 filed on Oct. 27, 2015, and claims priority to Japanese Patent Application No. 2014-225422 filed on Nov. 5, 2014, the entire content of both of which is incorporated herein by reference.

TECHNICAL FIELD

The present invention relates to an identification apparatus, a control method therefor, and a storage medium.

BACKGROUND ART

Conventionally, there is known a technique of identifying, when malware is discovered on a computer, the intrusion route of the malware (see PTL 1). If the intrusion route can be identified, it is possible to take measures such as blockage of a point of intrusion. However, even if the point of intrusion is blocked, malware which has already entered does not disappear automatically. In an organization such as a company or school, a number of computers are connected via a network, and malware which has entered may be widely spread via the network. As a technique of grasping the spread range of malware, there is known a technique disclosed in PTL 2. According to PTL 2, a PC which has accessed a file detected as malware (virus) is identified, and then a procedure of cutting off the PC from the network is performed.

CITATION LIST

Patent Literature

PTL 1: International Publication No. 2014/087597
PTL 2: Japanese Patent Laid-Open No. 2009-176132

SUMMARY OF INVENTION

Technical Problem

In PTL 2, however, only a PC which has directly accessed a file detected as malware (virus) is detected. For this reason, it is impossible to cope with a case in which, for example, a given PC (PCA) accesses a file detected as malware, and then copies it to another PC (PCB). In this case, PCA is a target to be cut off from a network but PCB is not a target. Thus, it may be impossible to prevent spread of the malware.

The present invention has been made in consideration of the above situation, and provides a technique for improving the identification accuracy of the spread range of malware.

Solution to Problem

To solve the above problem, the present invention provides an identification apparatus for identifying a spread range of malware, comprising: a storage unit configured to store an operation history as a history of an operation executed in at least one information processing apparatus; an acquisition unit configured to acquire malware spread information including information indicating malware; and an identification unit configured to identify, based on the operation history, an intrusion route of the malware indicated by the malware spread information acquired by the acquisition unit, generate at least one piece of malware spread information corresponding to at least one operation included in the intrusion route in the operation history, and identify, in the operation history, for each of the at least one piece of malware spread information, at least one operation of spreading the malware by setting, as a direct or indirect start point, the malware indicated by the malware spread information.

Advantageous Effects of Invention

According to the present invention, it is possible to improve the identification accuracy of the spread range of malware.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate exemplary embodiments of the invention and, together with the description, serve to explain the principles of the present invention.

FIG. 3 is a table showing an example of the format of PC operation logs 6;
FIG. 4 is a table showing an example of a malware spread range list 5 about files;
FIG. 5 is a table showing an example of the malware spread range list 5 about registries;
FIG. 6 is a table showing an example of the malware spread range list 5 about shared memories;
FIG. 11 is a flowchart illustrating trace flow 1-B;
FIG. 12A is a flowchart illustrating trace flow 2;
FIG. 12B is a flowchart illustrating trace flow 2;
FIG. 14A is a flowchart illustrating trace flow 4;
FIG. 14B is a flowchart illustrating trace flow 4;
FIG. 15A is a flowchart illustrating trace flow 2-A;
FIG. 17 is a table showing examples of PC operation logs;
FIG. 18 is a table showing a malware spread range list obtained by back-tracing the PC operation logs shown in FIG. 17;
FIG. 19 is a table showing examples of PC operation logs;
FIG. 20 is a table showing a malware spread range list obtained by back-tracing the PC operation logs shown in FIG. 19, 25, or 28;
FIG. 21 is a table showing examples of PC operation logs;

FIG. 22 is a table showing a malware spread range list obtained by back-tracing the PC operation logs shown in FIG. 21;

FIG. 23 is a table showing examples of PC operation logs;

FIG. 24 is a table showing a malware spread range list obtained by back-tracing the PC operation logs shown in FIG. 23;

FIG. 25 is a table showing examples of PC operation logs;

FIG. 26 is a table showing a result of forward-tracing halfway a malware spread range list obtained by back-tracing the PC operation logs shown in FIG. 25;

FIG. 27 is a table showing a result of forward-tracing the sixth row "removable device (outlet)" of the malware spread range list shown in FIG. 26;

FIG. 28 is a table showing examples of PC operation logs;

FIG. 29 is a table showing a result of forward-tracing halfway a malware spread range list obtained by back-tracing the PC operation logs shown in FIG. 28;

FIG. 30 is a table showing a result of forward-tracing the sixth row "sharing (outlet)" of the malware spread range list shown in FIG. 29;

FIG. 31A is a table showing an example of a malware spread range list;

FIG. 31B is a table showing the example of the malware spread range list;

FIG. 33 is a table showing a result of forward-tracing the PC operation logs shown in FIG. 17;

FIG. 34 is a table showing a result of forward-tracing the PC operation logs shown in FIG. 19;

FIG. 35 is a table showing a result of forward-tracing the PC operation logs shown in FIG. 21; and FIG. 36 is a table showing a result of forward-tracing the PC operation logs shown in FIG. 23.

DESCRIPTION OF EMBODIMENTS

Embodiments of the present invention will be described below with reference to the accompanying drawings. Note that the technical scope of the present invention is defined by the scope of the claims, and is not limited by the following embodiments. Not all combinations of features explained in the following embodiments are essential to the present invention.

First Embodiment

Spread of Malware

Figure 1:
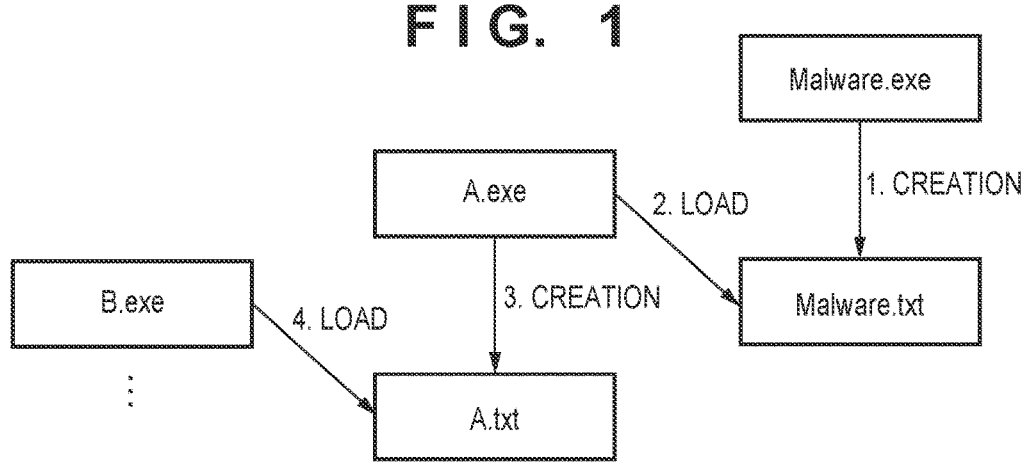
FIG. 1 is a schematic view showing spread of malware.

Malware assumed in this embodiment and spread of the malware will be described first with reference to FIG. 1.

A file "Malware.exe" is malware, and includes a binary or script code for operating as malware. If "Malware.exe" is executed as a process to create a file "Malware.txt", "Malware.txt" may include a binary or script code for operating as malware. Thus, in this embodiment, "a file created by malware" is also regarded as malware.

If another process "A.exe" which is not malware loads "Malware.txt" regarded as malware, the process "A.exe" may operate as malware. In this embodiment, therefore, "a process which has loaded a file created by malware" is also regarded as malware. However, if the process "A.exe" which has loaded "Malware.txt" ends, the data of the loaded file "Malware.txt" is discarded from a memory. Thus, when "A.exe" is activated again as a process, it may be regarded as a normal process. In this embodiment, therefore, during a period from when the process "A.exe" loads "Malware.txt" until it ends, the process "A.exe" is regarded as malware.

If a file "A.txt" is created while "A.exe" is regarded as malware, "A.txt" may include a malware code similar to "Malware.txt". Thus, if another process "B.exe" loads "A.txt", it is also regarded as malware.

Since the thus created file "A.txt" is included in the spread range of the malware, file information of the file is registered in a "malware spread range list" (to be described later). Not only when the process "A.exe" "loads the file created by the malware" but also when the process "A.exe" "loads a registry changed by the malware" or "accesses a shared memory used by the malware", the process "A.exe" is regarded as malware. That is, if the registry or shared memory is created/changed by the malware, the information of the registry or shared memory is also registered in the malware spread range list, similarly to the file information. If the process "B.exe" further creates a file, registry, or the like, a process which has loaded the file, registry, or the like is also handled in the same manner.

If the file "A.exe" is activated as a process by another malware, the process "A.exe" may receive data from the malware by some method (parameters at the time of activation, communication between the processes, or the like). Therefore, similarly to the above-described case, the process "A.exe" is regarded as malware.

By executing the above-described processing, files, registries, and the like which may have been infected with the malware are registered in the malware spread range list. After the completion of the processing, it is possible to grasp, in a file unit or registry unit, a range within which the malware may infect, by referring to the malware spread range list. In addition, for example, even if there exists a file which cannot be detected as malware unless it is activated, it is possible to detect such file as malware by referring to the malware spread range list.

As is apparent from the above description, in this embodiment, an expression of "a file is infected with malware" means that the file includes (or may include) a binary or script code for operating as malware. If such file is executed as a process, the process may operate as malware. Furthermore, if another process loads such file, it may also operate as malware.

<<Overall Arrangement of Identification Apparatus>>

Figure 2:
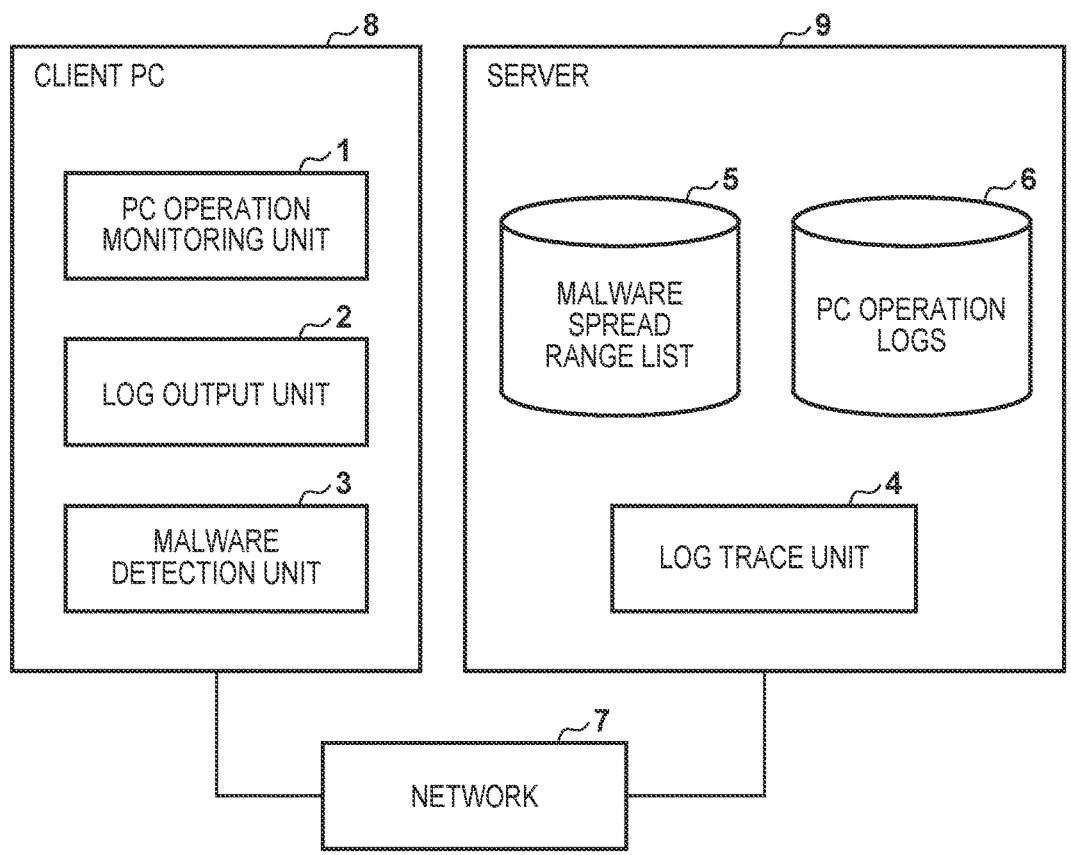
FIG. 2 is a block diagram showing the overall arrangement of an identification apparatus for identifying the spread range of malware.

The overall arrangement of an identification apparatus for identifying the spread range of malware will be described with reference to FIG. 2. The identification apparatus includes a client PC 8 (information processing apparatus) and a server 9 which are interconnected via a network 7. Although FIG. 2 shows only one client PC 8, a plurality of client PCs may be connected to the network 7.

A PC operation monitoring unit 1 monitors an operation/processing in the client PC 8. If, for example, an arbitrary process is activated, the PC operation monitoring unit 1 acquires information (a file path, file size, file hash value, and the like) about the process, and holds the information. This information is used to determine whether the activated process has been registered in the malware spread range list (to be described later). Examples of the operation/processing monitored by the PC operation monitoring unit 1 are as follows.

File generation/change/load
Registry key generation/change/access
Shared memory generation/change/access
Access to URL
Email reception Upon detecting one of the above operations, the PC operation monitoring unit 1 notifies a log output unit 2 (to be described later) of operation contents to be output as a PC operation log. Examples of a technique used by the PC operation monitoring unit 1 are a file system filter driver, network filter driver, packet filter driver, and Windows® standard API.

A malware detection unit 3 determines whether an object on the client PC 8 is malware. If the object is malware, the malware detection unit 3 detects it. If malware is detected, the malware detection unit 3 records information (the sample name, file path, hash value, and the like of the malware) about the malware in the PC operation logs as a malware detection log. Antivirus software or the like may be used for the malware detection unit 3. Although the malware detection unit 3 is arranged on the client PC 8 in FIG. 2, this is not intended to limit the arrangement location of the malware detection unit 3. The malware detection unit 3 may be arranged on, for example, the server 9 or the network 7.

The log output unit 2 outputs, as a PC operation log, an operation (creation/deletion/rename/copy/movement of a file, creation/change of a registry, creation/change of a shared memory, or the like) on the computer, which has been detected by the PC operation monitoring unit 1. Although the log output unit 2 is arranged on the client PC 8 in FIG. 2, this is not intended to limit the arrangement location of the log output unit 2. The log output unit 2 may be arranged on, for example, the server 9 or the network 7.

PC operation logs 6 are logs each recording an operation (creation/deletion/rename/copy/movement of a file, creation/change of a registry, creation/change of a shared memory, mail reception, Web access, or the like) on the computer. The PC operation logs 6 are generated by the log output unit 2. FIG. 3 shows an example of the format of the PC operation logs 6. The PC operation logs 6 are obtained by integrating/accumulating the operation logs of a plurality of client PCs via the network 7. Although the PC operation logs 6 are arranged on the server 9 in FIG. 2, this is not intended to limit the arrangement location of the PC operation logs 6. The PC operation logs 6 may be arranged on, for example, the client PC 8.

A malware spread range list 5 holds information about a file, a registry, a shared memory, or the like which is infected (or may be infected) with the malware and information such as a spread route. FIG. 4 shows an example of the malware spread range list 5 about files. FIG. 5 shows an example of the malware spread range list 5 about registries. FIG. 6 shows an example of the malware spread range list 5 about shared memories. Referring to FIG. 4, the malware spread range list 5 holds pieces of information such as a PC name storing a file, a path (file path), a hash value, and a size. This is merely an example, and is not intended to limit the types and number of pieces of information held in the malware spread range list 5. Furthermore, although the malware spread range list 5 is arranged on the server 9 in FIG. 2, this is not intended to limit the arrangement location of the malware spread range list 5. The malware spread range list 5 may be arranged on, for example, the client PC 8. The pieces of information held in the malware spread range list 5 will be described below.

Type (Cause Information)

A type indicates a medium by which malware is spread (a cause of spread or intrusion of the malware). For example, if malware in a file format is copied by another process, the type is "file". If malware in a file format is copied to a removable device, and spread to another PC via the removable device, the type is "removable device". If malware in an execution format writes data in a registry key, the type is "registry". If malware in an execution format writes data in a shared memory, the type is "shared memory".

ID and Parent ID

An ID and parent ID are pieces of information indicating a spread sequence in which malware is spread. For example, in the case of FIG. 4, the parent IDs of IDs "2" and "3" are both "1". This indicates that a file "C:\virus.exe" recorded with an ID "1" is copied to two locations, that is, "C:\Program Files\virus.exe" recorded with the ID "2" and "C:\Windows\virus.exe" recorded with the ID "3". If an ID is newly issued, a method of assigning a value obtained by adding 1 to the maximum value of the ID in the malware spread range list 5 or the like is considered.

Other Information

In addition to the above-described pieces of information, information different for each type is recorded in the malware spread range list 5 (this information is generated based on the information recorded as the PC operation log 6). If, for example, the type is "file", a file name, a file path, a file hash value, an operation name, an operation time, and the like are recorded.

Subsequently, a log trace unit 4 will be described. The log trace unit 4 traces the PC operation logs 6 in a time sequence. If a log matching specific conditions is found, the log trace unit 4 registers the log in the malware spread range list 5. For example, if there is a log indicating that a file registered in the malware spread range list 5 has been copied to another location, the file information of the copy destination is registered in the malware spread range list 5. Furthermore, although the log trace unit 4 is arranged on the server 9 in FIG. 2, this is not intended to limit the arrangement location of the log trace unit 4. The log trace unit 4 may be arranged on, for example, the client PC 8.

<<Hardware Arrangement of Each of Client PC 8 and Server 9>>

The hardware arrangement of each of the client PC 8 and the server 9 will be described with reference to FIG. 7. Each of the client PC 8 and the server 9 can be implemented by a computer shown in FIG. 7.

A CPU 81 controls the overall computer using computer programs and data stored in a ROM 82 and a RAM 83. If this computer is applied to the server 9, the CPU 81 executes processes to be described later as processes to be executed by the server 9. If this computer is applied to the client PC 8, the CPU 81 executes processes to be described later as processes to be executed by the client PC 8.

The setting data of the computer, a boot program, and the like are stored in the ROM 82. The RAM 83 has an area for temporarily storing computer programs and data loaded from an HDD (Hard Disk Drive) 84, data externally received via an interface 87, and the like. Furthermore, the RAM 83 has a work area used by the CPU 81 to execute various kinds of processes. That is, the RAM 83 can provide various areas, as needed.

The HDD 84 saves an OS (Operating System), computer programs and data for causing the CPU 81 to execute various kinds of processes to be performed by the apparatus to which this computer is applied, and the like. If this computer is applied to the server 9, associated computer programs include computer programs for causing the CPU 81 to execute processes to be described later as processes to be executed by the server 9. The malware spread range list 5 and the PC operation logs 6 are also stored in the HDD 84. If this computer is applied to the client PC 8, associated computer programs include computer programs for causing the CPU 81 to execute processes to be described later as processes to be executed by the client PC 8. The computer programs and data saved in the HDD 84 are loaded into the RAM 83, as needed, under the control of the CPU 81, and processed by the CPU 81.

An input device 85 is formed by a keyboard, a mouse, and the like. The operator of the computer can input various instructions to the CPU 81 by operating the input device 85.

A display device 86 is formed by a CRT, a liquid crystal screen, or the like, and can display the processing result of the CPU 81 using an image, characters, and the like.

The interface 87 includes various interfaces. For example, if the computer is applied to the client PC 8, the interface 87 includes a network interface for connecting the computer to the network 7, and a device interface for connecting an external recording medium to the computer. If the computer is applied to the server 9, the interface 87 includes a network interface for connecting the computer to the network 7.

A bus 88 interconnects the above-described units.

Figure 7:
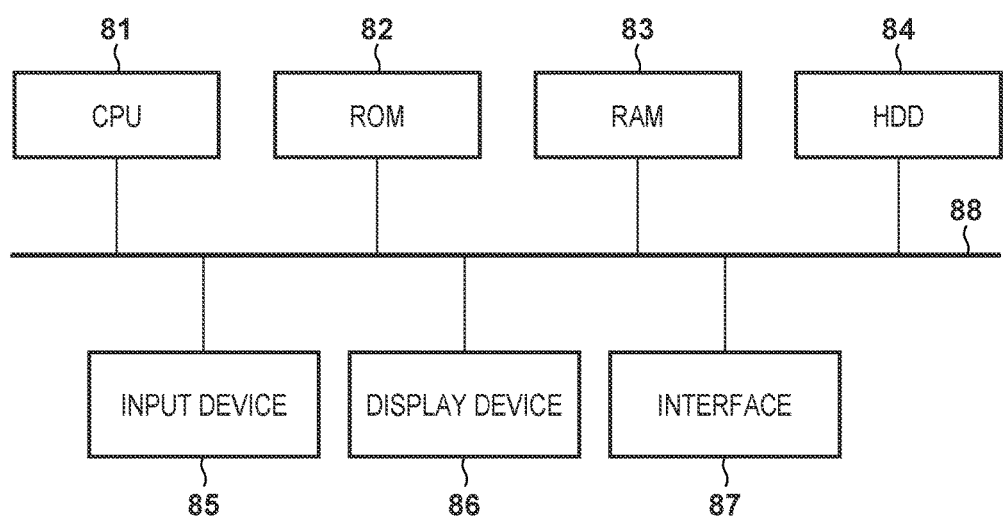
FIG. 7 is a view showing the hardware arrangement of each of a client PC 8 and a server 9.

In this embodiment, for the sake of simplicity, assume that each of the client PC 8 and the server 9 is a computer having the arrangement shown in FIG. 7. However, the arrangement of the computer is not limited to this. Computers having different arrangements may be used for the client PC 8 and the server 9.

<<PC Operation Log Output Processing>>

PC operation log output processing by the client PC 8 will be described with reference to FIG. 8. Upon activation of the client PC 8, the processing of the flowchart starts (step S800).

In step S801, the PC operation monitoring unit 1 determines whether a predetermined operation has been performed in the client PC 8. If the predetermined operation has been performed, the process advances to step S802; otherwise, the process advances to step S803. Examples of the operation monitored by the PC operation monitoring unit 1 are as follows.

File copy/movement/rename/load
Registry creation/change/access
Shared memory creation/change/access
Process activation
Web access
Mail reception, removable device connection/detachment
Access to shared folder In step S802, the PC operation monitoring unit 1 notifies the log output unit 2 of contents of the operation performed in the client PC 8, and the log output unit 2 outputs the contents of the operation as a PC operation log. The output log is transmitted to the server 9 via the network 7, and accumulated as the PC operation log 6. Note that the PC operation log 6 may be saved in the client PC 8.

In step S803, the malware detection unit 3 determines whether malware has been detected in the client PC 8. If malware has been detected, the process advances to step S804; otherwise, the process advances to step S805.

In step S804, the malware detection unit 3 notifies the log output unit 2 that the malware has been detected, and the log output unit 2 outputs a PC operation log indicating malware detection. The PC operation log indicating malware detection includes, for example, the information of a file detected as malware. The PC operation log indicating malware detection has the same format as that of the normal PC operation log output in step S802, and is accumulated as the PC operation log 6.

In step S805, the PC operation monitoring unit 1 determines whether an instruction to shut down the client PC 8 has been issued. If a shutdown instruction has been issued, the client PC 8 is shut down, and the processing of the flowchart ends. If no shutdown instruction has been issued, the process returns to step S801. That is, while the client PC 8 is active, the processes in steps S801 to S805 are repeated.

<<Log Trace Processing>>

Log trace processing executed by the log trace unit 4 will be described with reference to FIG. 9. The log trace unit 4 traces the PC operation logs 6, and outputs the malware spread range list 5 as a result. By referring to the output malware spread range list 5, it is possible to grasp the spread range of the malware.

Figure 8:
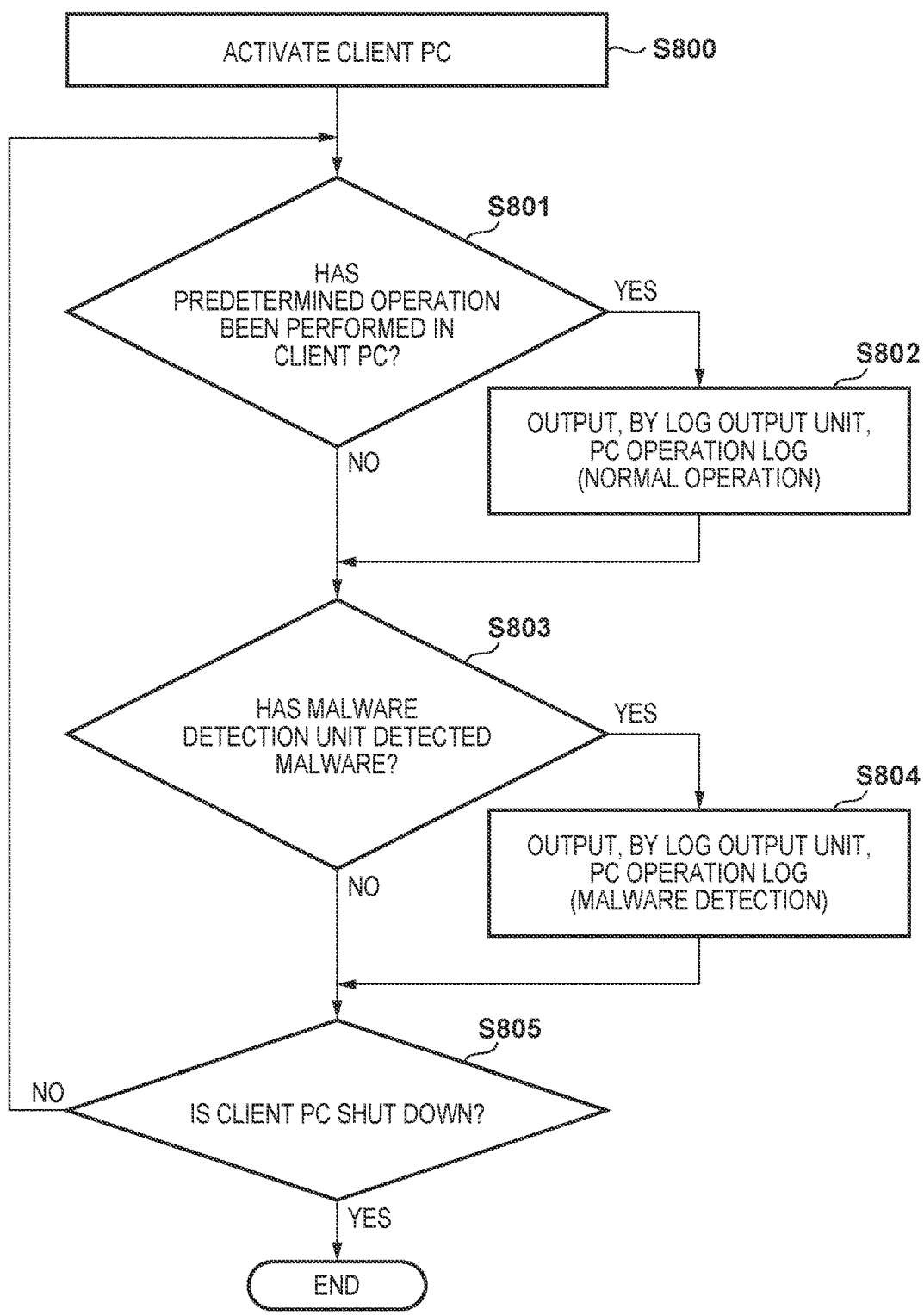
FIG. 8 is a flowchart illustrating PC operation log output processing by the client PC 8.

In step S900, the log trace unit 4 discovers the malware detection log output in step S804 of FIG. 8 from the PC operation logs 6. Note that in this embodiment, if the malware detection log exists, the log trace processing starts. A log trace processing start condition is not limited to this. For example, when the user designates a file path, a hash value, and the like with respect to an arbitrary file in the same format as that of the malware detection log, the log trace processing may start. This makes it possible to identify the spread range of a file which has not been detected as malware.

In step S901, the log trace unit 4 follows the PC operation logs 6 in reverse chronological order based on pieces of information such as a file and time recorded in the malware detection log, thereby tracing a route by which the file or the like detected as malware has entered the client PC 8. The trace processing in step S901 will be referred to as a back trace hereinafter. As a result of the back trace, the log trace unit 4 registers, in the malware spread range list 5, all pieces of information of files and the like extracted as the intrusion route of the malware. For example, if the log trace unit 4 back-traces PC operation logs shown in FIG. 17, a malware spread range list shown in FIG. 18 is generated. Note that examples of the PC operation logs shown in FIG. 17 have a format different from that of the examples of the PC operation logs shown in FIG. 3. This is because, as described above, each PC operation log includes various items, as needed, and is not limited to a format including specific items. The following description will exemplify malware spread range lists and PC operation logs of various formats. However, these lists and logs are created within a range necessary for explanation, and are not intended to limit their formats to specific ones.

Even if malware creates a copy of itself at another location in a process of reaching a discovery location, it is possible to grasp a spread range from the other location by performing a back trace before a forward trace (to be described later). However, a back trace and processing of registering the result of the back trace in the malware spread range list 5 are not essential. If no back trace is performed, the log trace unit 4 registers, in the malware spread range list 5, information about the malware detection log discovered in step S900 (or information, such as a file path and hash value, about a file designated by the user).

In step S902, the log trace unit 4 acquires one of the rows registered in the malware spread range list 5. The acquired row includes, for example, a type of "file" (see the first row in FIG. 18), "Web" (see the first row in FIG. 22), "mail" (see the first row in FIG. 24), "removable device (inlet)" (see the seventh row in FIG. 27), "removable device (outlet)" (see the sixth row in FIG. 27), "sharing (inlet)" (see the seventh row in FIG. 30), or "sharing (outlet)" (see the sixth row in FIG. 30).

Each row of the malware spread range list 5 can be regarded as information (malware spread information) indicating spread of malware, and the malware spread information includes information indicating the malware or information indicating the intrusion source of the malware. For example, the first row in FIG. 18 includes a path "C:\Dir1\Malware.exe" as information indicating the malware. The first row in FIG. 22 includes a URL "http://example.com" as information indicating the intrusion source of the malware. Furthermore, the "type" of each row of the malware spread range list 5 can be regarded as information (cause information) indicating a cause of spread or intrusion of the malware. For example, the first row in FIG. 18 includes "file" as the type (cause information), which indicates that the malware has been spread due to a file. The first row in FIG. 22 includes "Web" as the type (cause information), which indicates that the malware has entered due to Web access. The first row in FIG. 24 includes "mail" as the type (cause information), which indicates that the malware has entered due to mail reception. The sixth row in FIG. 27 includes "removable device (outlet)" as the type (cause information), which indicates that the malware has been spread due to a removable device. The sixth row in FIG. 30 includes "sharing (outlet)" as the type (cause information), which indicates that the malware has been spread due to a shared folder.

As described above, if no back trace is performed, the log trace unit 4 registers, in step S901, in the malware spread range list 5, as malware spread information, information corresponding to the malware detection log discovered in step S900 (or information designated by the user). In this case, the row (that is, malware spread information) acquired in step S902 includes, for example, information like the third row in FIG. 18.

In step S903, the log trace unit 4 performs conditional branching of the processing based on the type of the row acquired in step S902. If the type is "file", the process advances to step S911 after executing three kinds of forward traces in steps S904 to S906. If the type is "Web", the process advances to step S911 after executing a forward trace in step S907. If the type is "mail", the process advances to step S911 after executing a forward trace in step S908. If the type is "removable device (outlet)", the process advances to step S911 after executing a forward trace in step S909. If the type is "sharing (outlet)", the process advances to step S911 after executing a forward trace in step S910. Note that "removable device (outlet)" and "sharing (outlet)" are merely examples, and "removable device (inlet)" and "sharing (inlet)" or "removable device" and "sharing" may be used. The processing contents of a forward trace are different depending on the type of the row (malware spread information) acquired in step S902. In short, a forward trace is processing of identifying one or more operations of spreading malware by setting, as a direct or indirect start point, the malware or intrusion source indicated by the malware spread information. Details of the seven kinds of forward traces in steps S904 to S910 will be described later with reference to FIGS. 10 to 16B.

Note that the sequence of the processes in steps S904 to S906 is not limited to this. Any sequence may be adopted or the processes may be parallelly executed.

In step S911, the log trace unit 4 searches the malware spread range list 5 for a row which has not been acquired. If there is no row which has not been acquired, it is considered that all the logs have been searched, thereby terminating the processing. If at least one row has not been acquired, the process returns to step S902. That is, the log trace unit 4 repeats the processes in steps S902 to S911 until it acquires all the rows registered in the malware spread range list 5. Note that if a row is added to the malware spread range list 5 by the forward trace in each of steps S904 to S910 while repeating the processes in steps S902 to S911, the added row is to be acquired in step S902.

In step S902, acquisition of the row registered in the malware spread range list 5 is not limited to the "type", and an "operation name", a "path name", or the like may be used. In this case, in step S903, the type is determined based on the row acquired in step S902, thereby performing conditional branching of the processing.

<<Trace Flow 1-A>>

The forward trace (trace flow 1-A) executed in step S904 of FIG. 9 will be described by exemplifying a case in which the PC operation logs shown in FIG. 17 are used. In this case, the malware spread range list shown in FIG. 18 is generated by the back trace in step S901 of FIG. 9, and the first row (a row at time 10:00) is acquired in step S902. Since the type of the row is "file", the process advance to step S904 in accordance with conditional branching in step S903.

Figure 10:
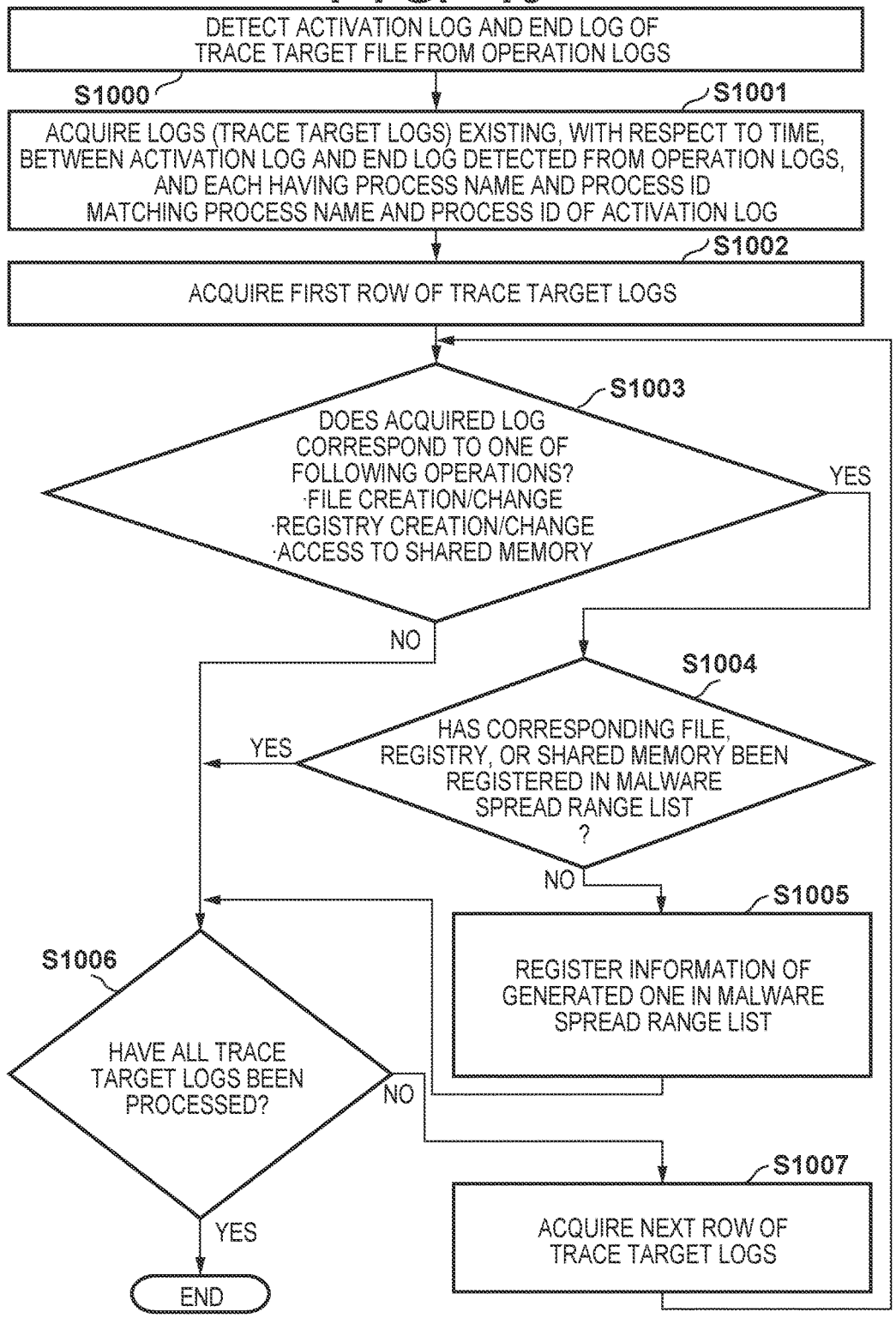
FIG. 10 is a flowchart illustrating trace flow 1-A.

FIG. 10 is a flowchart illustrating trace flow 1-A. Trace flow 1-A is a trace flow for detecting, as malware, a file, a registry, or the like generated by the malware activated as a process.

In step S1000, the log trace unit 4 detects, from the PC operation logs 6, the activation log and end log of a trace target file (C:\Dir1\Malware.exe). More specifically, the log trace unit 4 searches the PC operation logs 6 in a time sequence to detect a log satisfying conditions that a file path (C:\Dir1\Malware.exe) of the trace target matches a "source path" on the operation log and an operation name is "activation" or "end". In the PC operation logs shown in FIG. 17, a log at time 10:00 is detected as an activation log, and a log at time 11:12 is detected as an end log.

In step S1001, the log trace unit 4 acquires an operation log (trace target log) as a trace target from the PC operation logs 6. The trace target log is an operation log corresponding to an operation executed by a process during a period from when the trace target file (C:\Dir1\Malware.exe) is activated as the process until it ends. More specifically, the log trace unit 4 acquires all logs, existing between the activation log and the end log with respect to time, from logs each having the same "process name" and "process ID" as those of the activation log, and sorts them in chronological order. In the case of FIG. 17, a log at time 10:01 satisfies the conditions. Although there is only one tract target log (the log at time 10:01) in this example, a plurality of logs are generally acquired as trace target logs. Note that in this embodiment, the "process path" and "process ID" are used as log extraction conditions. However, any information included in the malware spread range list 5, for example, a hash value or the like may be used, and the number and types of pieces of information used as conditions are not limited.

In step S1002, the log trace unit 4 acquires the first row from the trace target logs acquired in step S1001, and sets the acquired row as a processing target in step S1003. In this example, the log at time 10:01 in FIG. 17 is acquired, and set as a processing target for step S1003.

In step S1003, the log trace unit 4 determines whether the log acquired in step S1002 corresponds to one of the following logs.

A log corresponding to new creation of a file or change of an existing file

A log of new creation of a registry key or change of an existing key

A log of access to a shared memory or new generation of a shared memory

If the processing target log satisfies the above condition, the generated/changed file or the like may have been infected with the malware. Therefore, the log trace unit 4 needs to register the generated/changed file or the like in the malware spread range list 5. That is, the process shifts to step S1004. More specifically, if the operation name is "creation", "overwrite", or "memory access", the log trace unit 4 determines that the processing target log satisfies the condition. In this example, the operation name of the log at time 10:01 in FIG. 17 is "creation", the process advances to step S1004.

Note that FIG. 17 includes only examples of files but the same applies to creation and overwrite of a registry, and access and overwrite of a shared memory. In this case, however, contents included in each operation log are changed, as needed (for example, in the case of a registry, the operation log includes a registry key instead of the source path, and in the case of a shared memory, the operation log includes a memory address instead of the source path).

In step S1004, the log trace unit 4 determines whether the current processing target operation log has already been registered in the malware spread range list 5. If the operation log has not been registered, the process advances to step S1005; otherwise, the process advances to step S1006. In this example, the log at time 10:01 in FIG. 17 is the processing target, and has already been registered (see FIG. 18). Therefore, the process advances to step S1006.

In step S1005, the log trace unit 4 registers the current processing target operation log in the malware spread range list 5.

In step S1006, the log trace unit 4 determines whether the processes in steps S1003 to S1006 have been performed for all the trace target logs acquired in step S1001. If the processes have been completed for all the trace target logs, the log trace unit 4 terminates the processing of trace flow 1-A. If there is a log which has not been processed, the log trace unit 4 advances to processing in step S1007.

In step S1007, the log trace unit 4 acquires a log temporally immediately after the log for which the processes in steps S1003 to S1006 were performed last, and performs the processes in steps S1003 to S1006 for the acquired log. That is, the processes in steps S1003 to S1006 are performed for all the operation logs included in the trace target logs acquired in step S1001.

If the processing of trace flow 1-A is applied to the operation logs shown in FIG. 17, the generated malware spread range list is the same as that shown in FIG. 18.

<<Trace Flow 1-B>>

The forward trace (trace flow 1-B) executed in step S905 of FIG. 9 will be described by exemplifying a case in which the PC operation logs shown in FIG. 17 are used. In this case, the malware spread range list shown in FIG. 18 is generated by the back trace in step S901 of FIG. 9, and the first row (the row at time 10:00) is acquired in step S902. Since the type of the row is "file", the process advance to step S904 in accordance with conditional branching in step S903. After that, trace flow 1-A described above is executed in step S904, and the process advances to step S905.

FIG. 11 is a flowchart illustrating trace flow 1-B. Trace flow 1-B is a trace flow for detecting, as malware, a process which has loaded the malware, a process which has been activated by the malware, or the like.

In step S1100, the log trace unit 4 acquires trace target logs from the PC operation logs 6. More specifically, a log indicating that an arbitrary process has been activated by a process registered in the malware spread range list 5 (a log satisfying conditions 1 (to be described later)) and a log indicating that an arbitrary process has loaded a row (file, registry, shared memory, or the like) registered in the malware spread range list 5 (a log satisfying conditions 2 (to be described later)) are acquired. As an example, a case will be described in which a trace target process is "C:\Dir1\Malware.exe" (that is, the path of the row acquired in step S902 of FIG. 9 is "C:\Dir1\Malware.exe"), and the PC operation logs shown in FIG. 17 exist.

(Conditions 1) An operation log satisfying conditions that the file name (a file name is extracted by removing a folder path from a file path) of the trace target matches a "parent process name" on the operation log, the process ID of the trace target matches a "parent process ID" on the operation log, and an operation name is "activation" or "end".

Under these conditions, a log at time 11:00 and a log at time 11:10 are acquired.

(Conditions 2) An operation log satisfying conditions that the file name (a file name is extracted by removing the folder path from the file path) of the trace target matches the "source path" on the operation log and an operation name is "load".

Under these conditions, a log at time 10:02 is acquired.

Next, the log trace unit 4 acquires operation logs satisfying one of the following sets of conditions, and sorts them in chronological order.

An operation log in which a "process ID" matches the process ID of the log satisfying conditions 1, a "process name" matches the process name of the log satisfying conditions 1, and time is between the "activation" log satisfying conditions 1 and the "end" log satisfying conditions 1

Under these conditions, a log at time 11:01 is acquired.

An operation log in which a "process ID" matches the process ID of the log satisfying conditions 2, a process name matches the process name of the log satisfying conditions 2, and time is after the time of the log satisfying conditions 2

Under these conditions, a log at time 10:10 and a log at time 11:11 are acquired.

If there exists a log satisfying the above conditions, the process advances to step S1101.

In step S1101, the log trace unit 4 acquires the first row from the trace target logs acquired in step S1100, and sets the acquired row as a processing target in step S1102.

In step S1102, the log trace unit 4 determines whether the log acquired in step S1101 corresponds to one of the following logs.

A log corresponding to new creation of a file or change of an existing file

A log of new creation of a registry key or change of an existing key

A log of access to a shared memory or new generation of a shared memory

If the processing target log satisfies the above condition, the generated/changed file or the like may have been infected with the malware. Therefore, the log trace unit 4 needs to register the generated/changed file or the like in the malware spread range list 5. That is, the process shifts to step S1103. Processes in steps S1103 to S1106 are the same as those in steps S1004 to S1007 of FIG. 10 and a description thereof will be omitted.

FIG. 33 shows a malware spread rage list generated by performing the processing of trace flow 1-B for the operation logs shown in FIG. 17.

<<Trace Flow 2>>

The forward trace (trace flow 2) executed in step S906 of FIG. 9 will be described by exemplifying a case in which the PC operation logs shown in FIG. 19 are used. In this case, a malware spread range list shown in FIG. 20 is generated by the back trace in step S901 of FIG. 9, and the first row (a row at time 10:00) is acquired in step S902. Since the type of the row is "file", the process advance to step S904 in accordance with conditional branching in step S903. After that, trace flow 1-A described above is executed in step S904, trace flow 1-B described above is executed in step S905, and thus the process advances to step S906.

FIGS. 12A and 12B are flowcharts illustrating trace flow 2. Trace flow 2 is a trace flow for detecting, as malware, a file as the copy or movement destination of the malware.

In step S1200, the log trace unit 4 acquires, from the PC operation logs 6, a log indicating that a trace target file (C:\Dir1\Malware.exe) has been, for example, copied, moved, or renamed. More specifically, logs in each of which a "source path" matches the file path of the trace target and an operation name is "copy", "rename", or "move" are acquired, and sorted in chronological order. In the case of FIG. 19, a log at time 10:01 satisfies the conditions. Although there is only one trace target log (the log at time 10:01) in this example, a plurality of logs are generally acquired as trace target logs.

In step S1201, the log trace unit 4 acquires the first row from the trace target logs acquired in step S1200, and performs processing in step S1202 for the acquired row. In this example, the log at time 10:01 in FIG. 19 is acquired, and set as a processing target for step S1202.

In step S1202, the log trace unit 4 determines whether the log acquired in step S1201 corresponds to one of the following operations.
 File copy
 File movement
 File rename If the copy/movement/rename source file is infected with the malware, the copied/moved/renamed file is considered to be infected with the malware. If the processing target log satisfies the above condition, the log trace unit 4 needs to register the copy/movement/rename destination file in the malware spread range list 5. That is, the process shifts to processing in step S1203. In this example, since the operation name of the log at time 10:01 in FIG. 19 is "rename", the process advances to step S1203.

In step S1203, the log trace unit 4 determines whether the information of the file of a "destination path" in the current processing target operation log has already been registered in the malware spread range list 5. If the information has not been registered, the process advances to step S1204; otherwise, the process advances to step S1205. In this example, the log at time 10:01 in FIG. 19 is a processing target, and has already been registered (see FIG. 20). Consequently, the process advances to step S1205.

In step S1204, the log trace unit 4 registers the current processing target operation log in the malware spread range list 5.

In step S1205, the log trace unit 4 determines whether the copy/movement/rename destination is a removable device. If the file is carried to a removable device or shared folder by an operation such as a copy/movement/rename operation, another PC may access the same removable device or shared folder, and copy the corresponding file. In this case, the malware may be spread via the removable device or shared folder. To grasp the spread range of the malware via such route, it is necessary to register the information of the corresponding removable device or shared folder and the information of the carried file in the malware spread range list 5. Thus, if the copy/movement/rename destination is a removable device, the process advances to step S1206; otherwise, the process advances to step S1208.

More specifically, if the "destination device type" of the processing target operation log is "Removable", it is determined that the copy/movement/rename destination is a removable device. In this example, since the destination device type of the log at time 10:01 in FIG. 19 is "Local", this condition is not satisfied. Note that an example of an operation log satisfying this condition is the fourth row (a copy to "F:\A.exe" at time 10:02) in FIG. 25.

In step S1206, the log trace unit 4 determines whether the information of the removable device in step S1205 has been registered in the malware spread range list 5. If the information has been registered, the process advances to step S1208; otherwise, the process advances to step S1207.

In step S1207, the log trace unit 4 registers the information of the removable device in step S1205 in the malware spread range list 5. The "destination path" of the log (processing target log) acquired in step S1201 is set in the "path" of the row to be registered, and "removable device (outlet)" is set in the "type". The type indicates that the file has been carried to the removable device. Note that processing when the type of the row acquired in step S902 of FIG. 9 is "removable device (outlet)" will be described later with reference to FIGS. 15A, 15B, and 25 to 27.

In step S1208, the log trace unit 4 determines whether the copy/movement/rename destination is a shared folder. If the destination is a shared folder, the process advances to step S1209; otherwise, the process advances to step S1211. More specifically, if the "destination device type" of the processing target log is "Remote", it is determined that the copy/movement/rename destination is a shared folder. In this example, since the destination device type of the log at time 10:01 in FIG. 19 is "Local", this condition is not satisfied. Note that an example of an operation log satisfying the condition is the third row (a copy to "\\PCB\share\A.exe" at time 10:02) in FIG. 28.

In step S1209, the log trace unit 4 determines whether the information of the shared folder in step S1208 has been registered in the malware spread range list 5. If the information has been registered, the process advances to step S1211; otherwise, the process advances to step S1210.

In step S1210, the log trace unit 4 registers the information of the shared folder in step S1208 in the malware spread range list 5. The "destination path" of the log (processing target log) acquired in step S1201 is set in the "path" of the row to be registered, and "sharing (outlet)" is set in the "type". This type indicates that the file has been carried to the shared folder. Note that processing when the type of the row acquired in step S902 of FIG. 9 is "sharing (outlet)" will be described later with reference to FIGS. 16A, 16B, and 28 to 30.

Processes in steps S1211 and S1212 are the same as those in steps S1006 and S1007 of FIG. 10 and a description thereof will be omitted.

FIG. 34 shows a malware spread range list generated by executing the processing of trace flow 2 for the operation logs shown in FIG. 19.

<<Trace Flow 3>>

Trace flow 3 executed in step S907 of FIG. 9 will be described by exemplifying a case in which PC operation logs shown in FIG. 21 are used. In this case, a malware spread range list shown in FIG. 22 is generated by the back trace in step S901 of FIG. 9, and the first row (a row at time 9:50) is acquired in step S902. Since the type of the row is "Web", the process advance to step S907 in accordance with conditional branching in step S903.

Figure 13A:
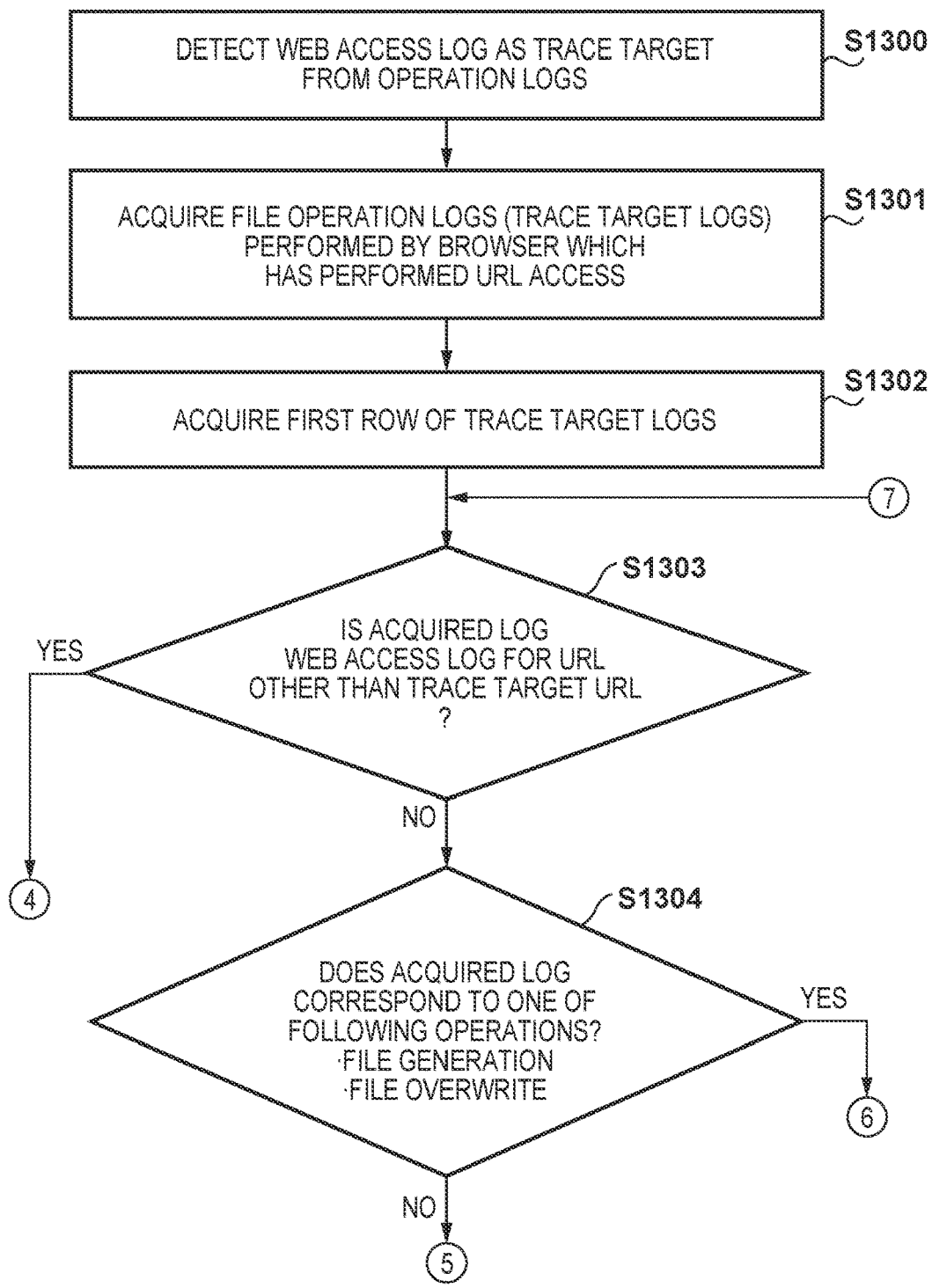
FIG. 13A is a flowchart illustrating trace flow 3.
Figure 13B:
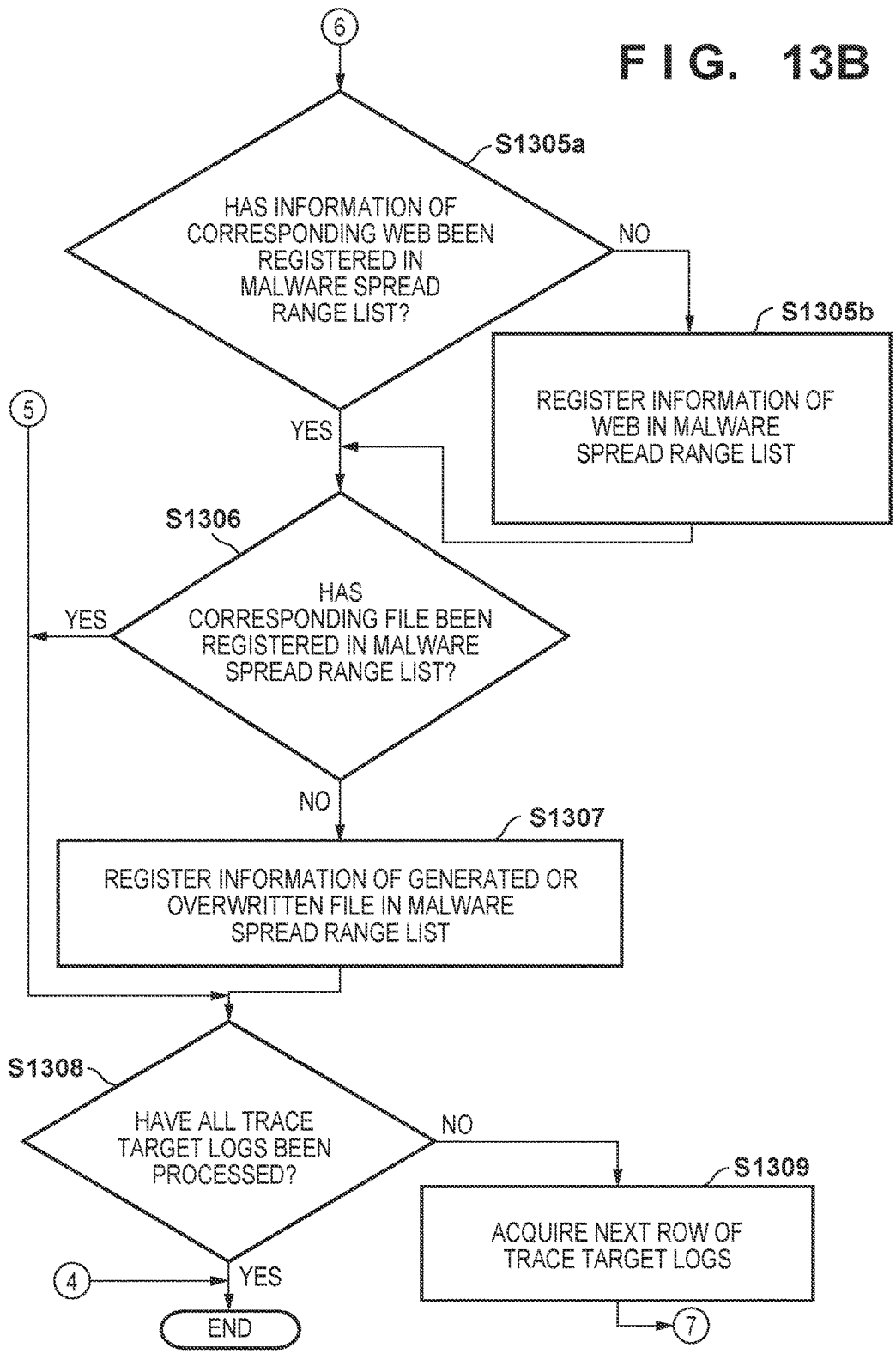
FIG. 13B is a flowchart illustrating trace flow 3.

FIGS. 13A and 13B are flowcharts illustrating trace flow 3. Trace flow 3 is a trace flow for detecting malware downloaded from the Web. That is, the trace flow is to detect whether there is a file generated or overwritten after a Web browser accesses a trace target URL.

In step S1300, the log trace unit 4 detects, from the PC operation logs 6, a Web access log indicating that a URL described in the row acquired in step S902 has been accessed. More specifically, the log trace unit 4 searches the PC operation logs 6 in a time sequence, and detects a log satisfying conditions that the "URL" of the trace target matches the "URL" of the PC operation log and an operation name is "Web access". However, a log whose "PC name", "time", and "URL" match those of the Web access log of the trace target acquired in step S902 is excluded. In FIG. 21, a log at time 13:00 of a PC name "PCB" is finally detected.

In step S1301, the log trace unit 4 acquires a log (trace target log) as a trace target from the PC operation logs 6. The trace target log is the log of processing executed by the browser when accessing the trace target URL. More specifically, operation logs each of which includes a process ID and process name matching those of the log detected in step S1300 and includes time later than that of the log detected in step S1300 are acquired, and sorted in chronological order. Note that the logs acquired in step S1301 do not include the log detected in step S1300. That is, in FIG. 21, three trace target logs of "creation" at time 13:01, "Web access" at time 13:02, and "creation" at time 13:03, all of which include a PC name "PCB", are acquired.

In step S1302, the log trace unit 4 acquires the first row from the trace target logs acquired in step S1301, and sets it as a processing target for step S1303. In this example, the log at time 13:01 of the PC name "PCB" in FIG. 21 is acquired, and set as a processing target for step S1303.

In step S1303, the log trace unit 4 determines whether the log acquired in step S1302 is a Web access log for a URL other than the trace target URL. More specifically, the log trace unit 4 determines whether the log acquired in step S1302 satisfies all the following conditions.

The operation name is "Web access".
The accessed URL does not match that of the log detected in step S1300.

If the processing target log satisfies all the conditions, the processing of trace flow 3 ends; otherwise (at least one of the above conditions is not satisfied), the process advances to step S1304. When the browser accesses another URL after accessing the trace target URL, it should be excluded from the trace target. To do this, the processing in step S1303 is performed. In this example, the operation name of the log at time 13:01 in FIG. 21 is "creation", and thus it is determined that not all of the above conditions are satisfied.

In step S1304, the log trace unit 4 determines whether the processing target log corresponds to one of the following operations.

File creation
File overwrite

If the processing target log satisfies the above condition, the generated or overwritten file is regarded as malware downloaded from the Web. Consequently, the log trace unit 4 needs to register the generated or overwritten file in the malware spread range list 5. That is, the process shifts to processing in step S1305a. In this example, since the operation name of the log at time 13:01 in FIG. 21 is "creation", the process advances to step S1305a. Note that although FIG. 21 includes only examples of files, the same applies to creation and overwrite of a registry, and access and overwrite of a shared memory. In this case, however, contents included in each operation log are changed, as needed (for example, in the case of a registry, the operation log includes a registry key instead of the source path, and in the case of a shared memory, the operation log includes a memory address instead of the source path).

In step S1305a, the log trace unit 4 determines whether the information of the corresponding Web has already been registered in the malware spread range list 5. More specifically, the log trace unit 4 determines whether there is a row in which a type is "Web", a URL, time, and a PC name match those of the log detected in step S1300, and an operation name is "Web access". If the information has not been registered, the process advances to step S1305b; otherwise, the process advances to step S1306.

In step S1305b, the log trace unit 4 adds, to the malware spread range list 5, a row indicating that malware has been downloaded from the Web. More specifically, a row in which a type is "Web", a URL is that detected in step S1300, and an operation name is "Web access" is added.

In step S1306, the log trace unit 4 determines whether the current processing target operation log has already been registered in the malware spread range list. If the operation log has not been registered, the process advances to step S1307; otherwise, the process advances to step S1308. In this example, the log at time 13:01 in FIG. 21 is a processing target, and has not been registered (see FIG. 22). Therefore, the process advances to step S1307.

In step S1307, the log trace unit 4 registers the current processing target operation log in the malware spread range list 5. With this operation, when the row registered in the malware spread range list 5 in this flow is loaded later in step S902 of FIG. 9, a forward trace is executed from there.

Processes in steps S1308 and S1309 are the same as those in steps S1006 and S1007 of FIG. 10 and a description thereof will be omitted.

FIG. 35 shows a malware spread range list generated by executing the processing of trace flow 3 for the operation logs shown in FIG. 21.

<<Trace Flow 4>>

Trace flow 4 executed in step S908 of FIG. 9 will be described by exemplifying a case in which PC operation logs shown in FIG. 23 are used. In this case, a malware spread range list shown in FIG. 24 is generated by the back trace in step S901 of FIG. 9, and the first row (a row at time 9:50) is acquired in step S902. Since the type of the row is "mail", the process advance to step S908 in accordance with conditional branching in step S903.

FIGS. 14A and 14B are flowcharts illustrating trace flow 4. Trace flow 4 is a trace flow for detecting that malware attached to mail has been downloaded.

In step S1400, the log trace unit 4 detects, from the PC operation logs 6, a log indicating that the same mail as that described in the row acquired in step S902 has been received. More specifically, the log trace unit 4 searches the PC operation logs 6 in a time sequence, and detects a log satisfying conditions that the "message ID" of the trace target matches that of the PC operation log and an operation name is "mail reception". However, a log whose "PC name", "time", and "message ID" match those of the mail reception log of the trace target acquired in step S902 is excluded. In FIG. 23, a log at time 13:00 of a PC name "PCB" is detected.

In step S1401, the log trace unit 4 acquires a log (trace target log) as a trace target from the PC operation logs 6. The trace target log is the log of processing executed by a mailer when receiving trace target mail. More specifically, operation logs each of which includes a process ID and process name matching those of the log detected in step S1400 and includes time later than that of the log detected in step S1400 are acquired, and sorted in chronological order. Note that the logs acquired in step S1401 do not include the log detected in step S1400. That is, in FIG. 23, a log at time 13:01 of a PC name "PCB" is acquired.

In step S1402, the log trace unit 4 acquires the first row from the trace target logs acquired in step S1401, and sets it as a processing target for step S1403. In this example, the log at time 13:01 of the PC name "PCB" in FIG. 24 is acquired, and set as a processing target for step S1403.

In step S1403, the log trace unit 4 determines whether the log acquired in step S1402 corresponds to one of the following operations.

File creation
File overwrite

If the processing target log satisfies the above condition, the generated or overwritten file is regarded as malware downloaded from the attached file. Consequently, the log trace unit 4 needs to register the generated or overwritten file in the malware spread range list 5. That is, the process shifts to processing in step S1404. In this example, since the operation name of the log at time 13:01 in FIG. 23 is "creation", the process advances to step S1404.

In step S1404, the log trace unit 4 adds, to the malware spread range list 5, a row indicating that the malware has been downloaded from the attached file. More specifically, a row in which a type is "mail", a mail address and message ID match the mail address detected in step S1400, and an operation name is "mail reception" is added.

In step S1405, the log trace unit 4 newly creates a row having the same format as that of the malware spread range list 5 based on the current processing target operation log, and determines whether the created row has already been registered in the malware spread range list 5. If the row has not been registered, the process advances to step S1406; otherwise, the process advances to step S1407. In this example, the log at time 13:01 in FIG. 23 is a processing target, and a row to be added to the malware spread range list is created based on the log. The created row includes a type "file", a PC name "PCB", time 13:01, a path "D:\Dir2\abcd.pdf", and an operation name "creation", and thus has not been registered (see FIG. 24). Therefore, the process advances to step S1406.

In step S1406, the log trace unit 4 registers the current processing target operation log in the malware spread range list 5. As a result of the processes in steps S1404 and S1406, the malware spread range list 5 changes from the state shown in FIG. 24 to that shown in FIG. 36. With this operation, when the row registered in the malware spread range list 5 in this flow is loaded later in step S902 of FIG. 9, a forward trace is executed from there.

Processes in steps S1407 and S1408 are the same as those in steps S1006 and S1007 of FIG. 10 and a description thereof will be omitted.

<<Trace Flow 2-A>>

Trace flow 2-A executed in step S909 of FIG. 9 will be described by exemplifying a case in which PC operation logs shown in FIG. 25 are used. Note that only a description about a removable device will be provided, and thus assumes a state in which the malware spread range list shown in FIG. 20 has been generated by back-tracing (step S901 of FIG. 9) the operation logs shown in FIG. 25, a forward trace has been performed based on the pieces of information shown in FIGS. 20 and 25, and a row (the sixth row in FIG. 26) whose type is "removable device (outlet)" has been acquired in step S902. Based on this assumption, the process advances to step S909 in accordance with conditional branching in step S903.

Figure 15B:
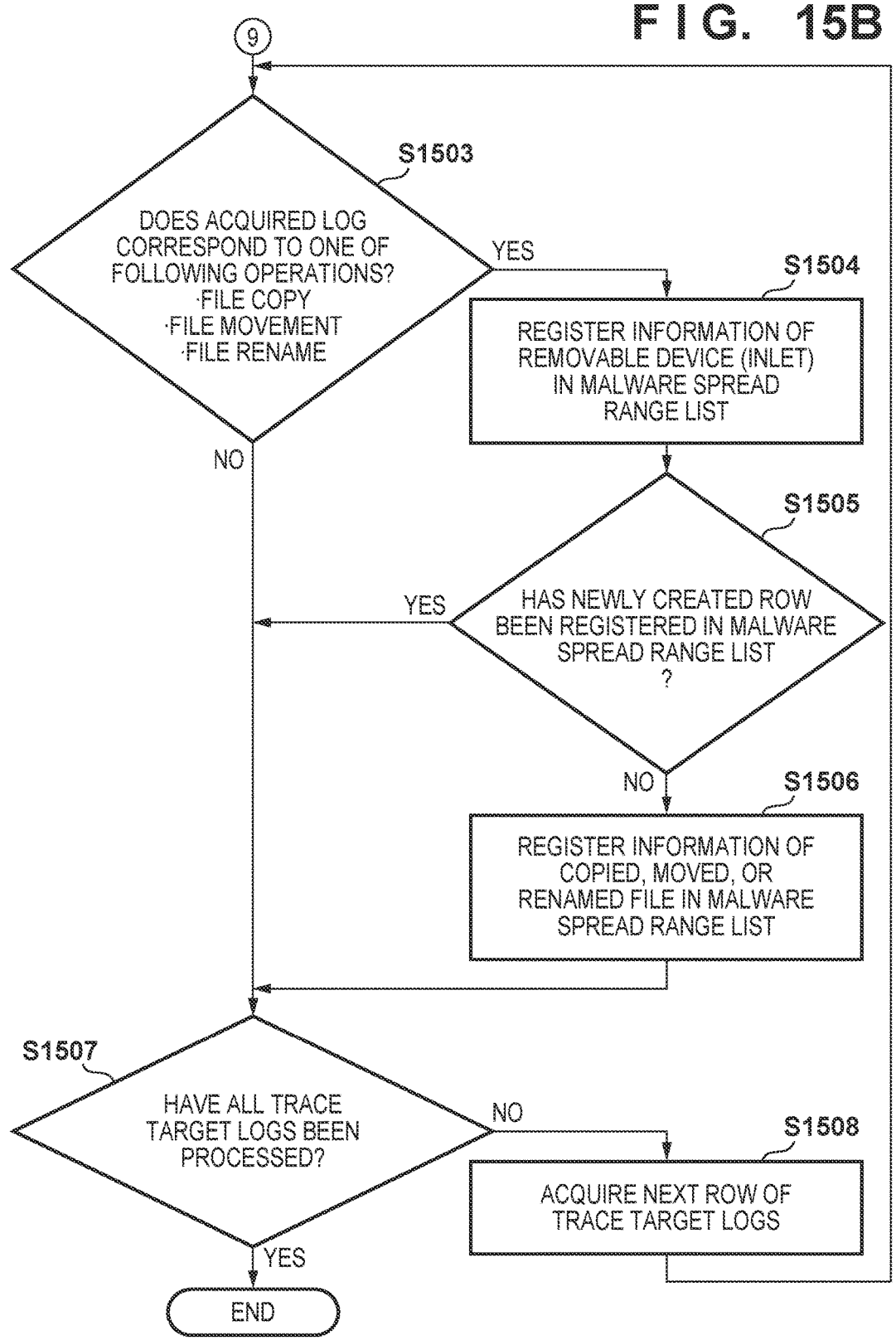
FIG. 15B is a flowchart illustrating trace flow 2-A.

FIGS. 15A and 15B are flowcharts illustrating trace flow 2-A. Trace flow 2-A is a trace flow for detecting that malware carried to a removable device has been spread to another PC via the removable device.

Figure 9:
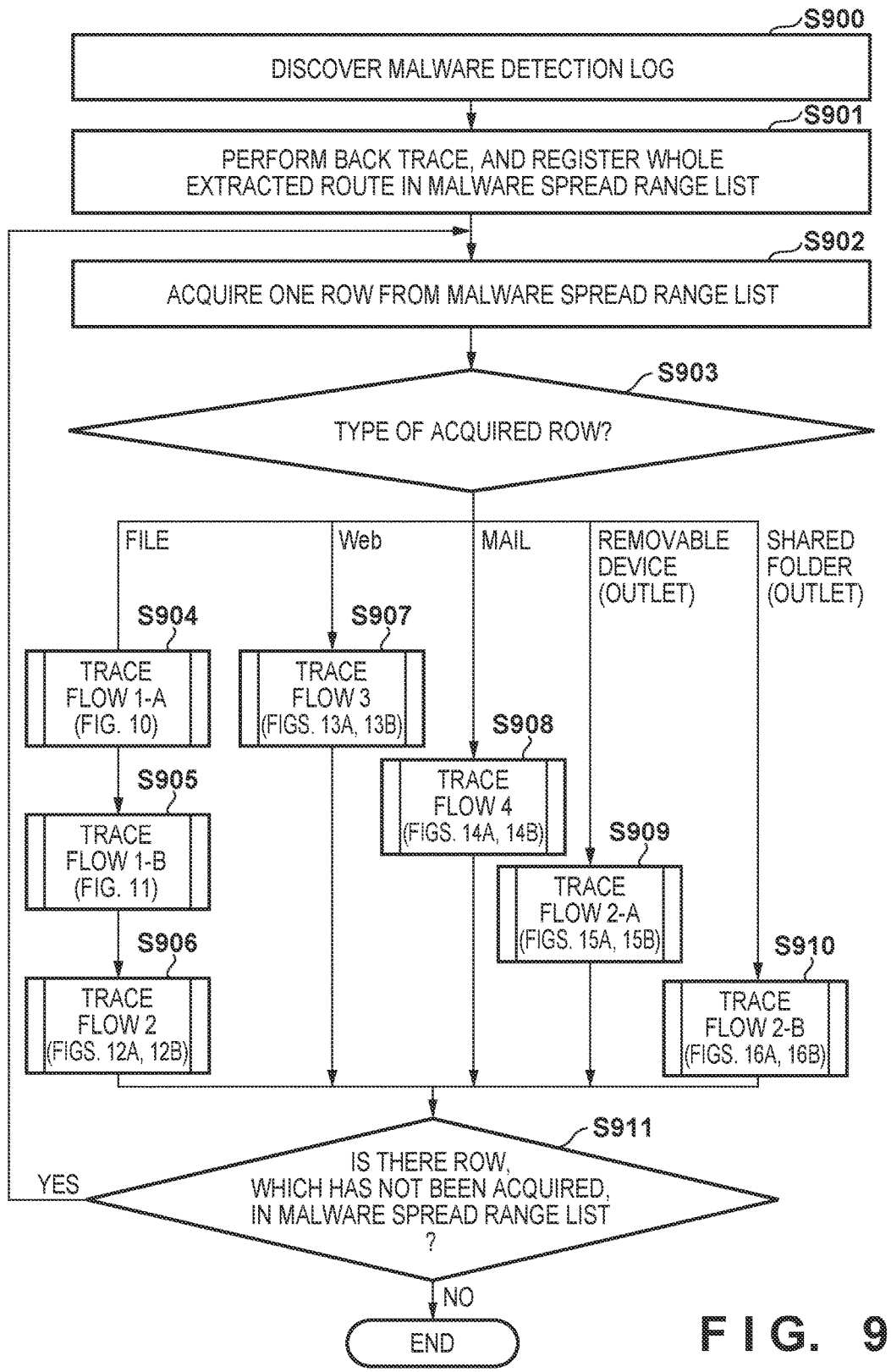
FIG. 9 is a flowchart illustrating log trace processing.

In step S1500, the log trace unit 4 detects, from the PC operation logs 6, a log indicating that a removable device having the same information as that of the removable device described in the row acquired in step S902 of FIG. 9 has been connected. More specifically, the log trace unit 4 searches the PC operation logs 6 in a time sequence, and detects a log satisfying conditions that the "serial ID", "vendor ID" and "product ID" of the trace target match those of the operation log and an operation name is "attach". In FIG. 25, a log at time 12:00 satisfies the conditions.

In step S1501, the log trace unit 4 acquires a log (trace target log) as a trace target from the PC operation logs 6. The trace target log is an operation log obtained when a trace target file is, for example, copied from a trace target device. More specifically, logs in each of which a source device type is "Removable", a drive letter included in a source path matches the drive letter of the log detected in step S1500, "a character string obtained by removing the drive letter from the path of the trace target" matches "a character string obtained by removing the drive letter from the source path of the operation log", and a PC name matches the PC name of the log detected in step S1500 are acquired, and sorted in chronological order. In FIG. 25, a log at time 12:05 is acquired as a trace target log.

In step S1502, the log trace unit 4 acquires the first row from the trace target logs acquired in step S1501, and sets it as a processing target for step S1503. In this example, the log at time 12:05 in FIG. 25 is acquired, and set as a processing target for step S1503.

In step S1503, the log trace unit 4 determines whether the log acquired in step S1502 corresponds to one of the following operations.

File copy
File movement
File rename

If the processing target log satisfies the above condition, when the copy/movement/rename source file is infected with malware, the copy/movement/rename destination file is considered to be infected with malware. Consequently, the log trace unit 4 needs to register the copied/moved/renamed file in the malware spread range list 5. That is, the process shifts to processing in step S1504. In this example, since the operation name of the log at time 12:05 in FIG. 25 is "copy", the process advances to step S1504.

In step S1504, the log trace unit 4 adds, to the malware spread range list 5, a row indicating that the malware has been spread via the removable device. More specifically, a row in which a type is "removable device (inlet)", a path is that acquired in step S1502, and a "serial ID", "vendor ID", and "product ID" match those of the log detected in step S1500 is added.

In step S1505, the log trace unit 4 newly creates a row having the same format as that of the malware spread range list 5 based on the operation log of the current processing target, and determines whether the created row has already been registered in the malware spread range list 5. If the row has not been registered, the process advances to step S1506; otherwise, the process advances to step S1507. In this example, the log at time 12:05 in FIG. 25 is a processing target, and a row to be added to the malware spread range list is created based on the log. The created row includes a type "file", a PC name "PCB", time 12:05, a path "C:\Local\A.exe", and an operation name "copy", and thus has not been registered (see FIG. 26). Therefore, the process advances to step S1506.

In step S1506, the log trace unit 4 registers the current processing target operation log in the malware spread range list 5. As a result of the processes in steps S1504 and S1506, the malware spread range list 5 changes from the state shown in FIG. 26 to that shown in FIG. 27. With this operation, when the row registered in the malware spread range list 5 in this flow is loaded later in step S902 of FIG. 9, a forward trace is executed from there. That is, a spread destination by the removable device is forward-traced. If the forward trace destination is also a removable device, the processing of trace flow 2-A restarts, and thus it is possible to grasp the spread range by all the removable devices.

Processes in steps S1507 and S1508 are the same as those in steps S1006 and S1007 of FIG. 10 and a description thereof will be omitted.

<<Trace Flow 2-B>>

Trace flow 2-B executed in step S910 of FIG. 9 will be described by exemplifying a case in which PC operation logs shown in FIG. 28 are used. Note that only a description about a shared folder will be provided, and thus assumes a state in which the malware spread range list shown in FIG. 20 has been generated by back-tracing (step S901 of FIG. 9) the operation logs shown in FIG. 28, a forward trace has been performed based on the pieces of information shown in FIGS. 20 and 28, and a row (the sixth row in FIG. 29) whose type is "sharing (outlet)" has been acquired in step S902. Based on this assumption, the process advances to step S910 in accordance with conditional branching in step S903.

Figure 16A:
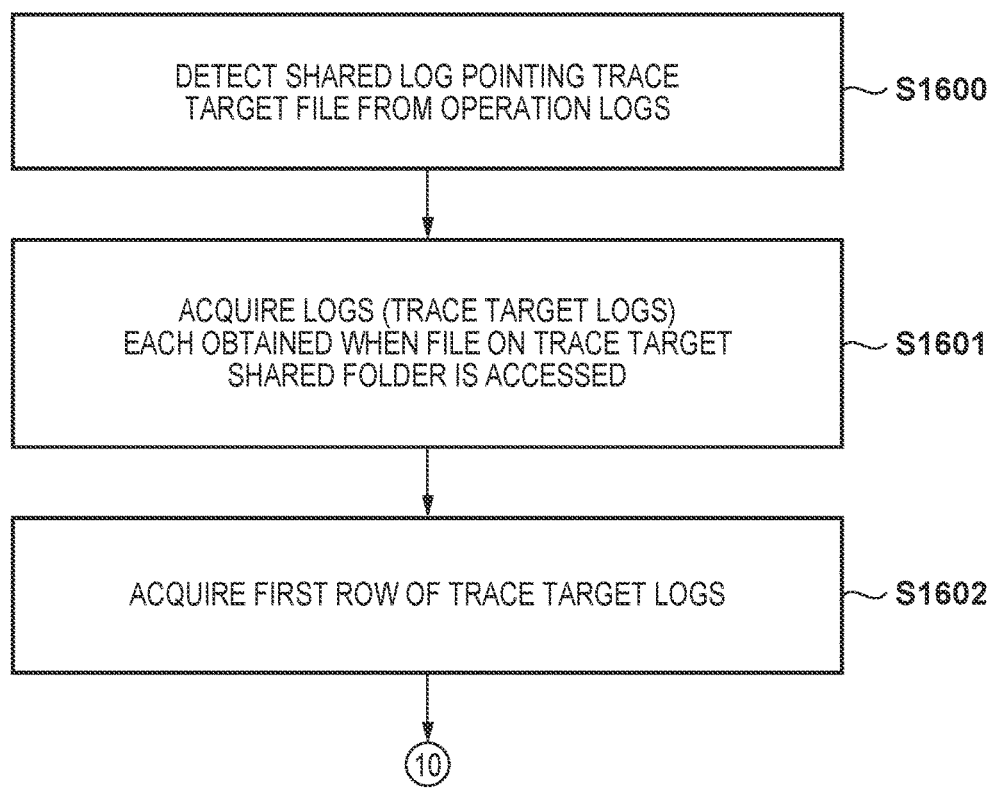
FIG. 16A is a flowchart illustrating trace flow 2-B.
Figure 16B:
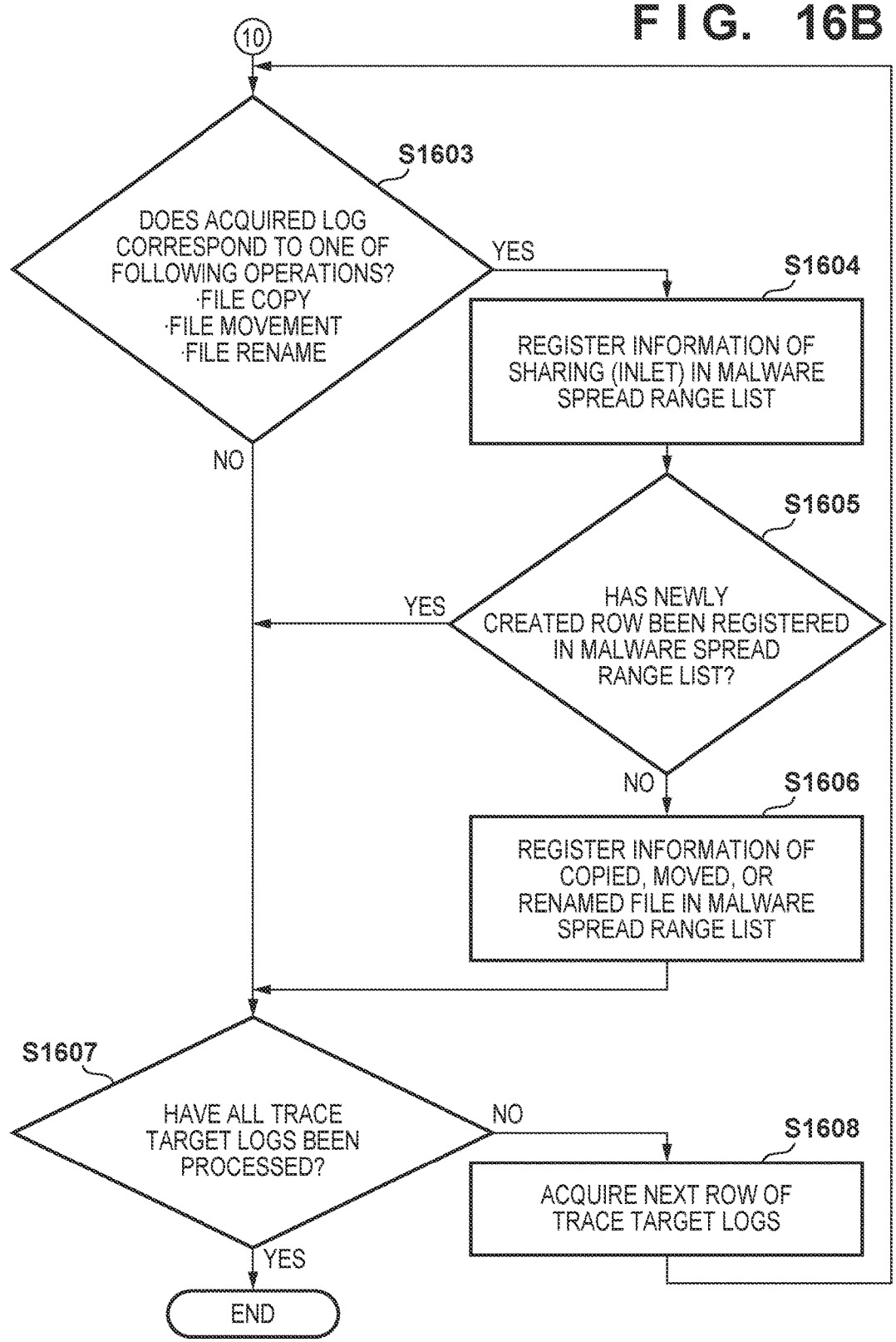
FIG. 16B is a flowchart illustrating trace flow 2-B.

FIGS. 16A and 16B are flowcharts illustrating trace flow 2-B. Trace flow 2-B is a trace flow for detecting that malware carried to a shared folder has been spread to another PC via the shared folder.

The following two methods of accessing a file on a shared folder are considered.

When a shared path is designated and accessed (When a path such as "\\PCB\share\A.exe" is designated and accessed)

When a local path is designated and accessed in a PC provided with a shared folder (When a path such as "C:\share\A.exe" is designated and accessed)

Referring to FIG. 28, at time 10:02, there are a log indicating a copy to "\\PCB\share\A.exe" and a shared log including a source path "C:\share\A.exe". This represents that a folder open to the public as a shared folder (\\PCB\share) exists at a path "C:\share\A.exe" in the PC (PCB) provided with the folder. That is, the paths "\\PCB\share\A.exe" and "C:\share\A.exe" point the same file. In consideration of this, if the trace target file exists in the shared folder, it is necessary to trace the two paths.

In step S1600, the log trace unit 4 detects information necessary to track the latter one of two access methods for the shared folder. More specifically, an operation log satisfying the following four conditions is detected.

(1) A file name extracted from the source path matches that extracted from the path of the trace target.

(2) A shared PC name (a character string between "\\" at the beginning of the shared path and next "\"; "PCB" for "\\PCB\share\A.exe") extracted from the path of the trace target matches the PC name.

(3) Time matches that of the trace target.

(4) An operation name is "shared log".

Referring to FIG. 28, "shared log" at time 10:02 is detected.

In step S1601, the log trace unit 4 acquires a log (trace target log) as a trace target from the PC operation logs 6. The trace target log is an operation log obtained when the file at the path of the trace target (the path on the shared folder) is, for example, copied. More specifically, operation logs satisfying one of the following sets of conditions are acquired, and sorted in chronological order.

A source device type is "Remote" and "a character string obtained by removing the shared PC name from the path of the trace target" matches "a character string obtained by removing the shared PC name from the source path of the operation log".

A source path matches that of "shared log" detected in step S1600.

In FIG. 28, a log at time 10:05 and a log at time 12:00 are acquired as trace target logs.

In step S1602, the log trace unit 4 acquires the first row from the trace target logs acquired in step S1601, and sets it as a processing target for step S1603. In this example, the log at time 10:05 in FIG. 28 is acquired, and set as a processing target for step S1603.

In step S1603, the log trace unit 4 determines whether the processing target log acquired in step S1602 corresponds to one of the following operations.

File copy
File movement
File rename

If the processing target log satisfies the above condition, when a copy/movement/rename source file is infected with malware, a copy/movement/rename destination file is considered to be infected with the malware. Consequently, the log trace unit 4 needs to register the copied/moved/renamed file in the malware spread range list 5. That is, the process shifts to processing in step S1604. In this example, since the operation name of the log at time 10:05 in FIG. 28 is "copy", the process advances to step S1604.

In step S1604, the log trace unit 4 adds, to the malware spread range list 5, a row indicating that malware has been spread via the shared folder. More specifically, a row in which a type is "sharing (inlet)" and a path is that acquired in step S1602 is added.

In step S1605, the log trace unit 4 newly creates a row having the same format as that of the malware spread range list 5 based on the current processing target operation log, and determines whether the created row has already been registered in the malware spread range list 5. If the row has not been registered, the process advances to step S1606; otherwise, the process advances to step S1607. In this example, the log at time 10:05 in FIG. 28 is a processing target, and a row to be added to the malware spread range list is created based on the log. The created row includes a type "file", a PC name "PCB", time 10:05, a path "D:\Dir10\A.exe", and an operation name "copy", and thus has not been registered (see FIG. 29). Therefore, the process advances to step S1606.

In step S1606, the log trace unit 4 registers the current processing target operation log in the malware spread range list 5.

Processes in steps S1607 and S1608 are the same as those in steps S1006 and S1007 of FIG. 10 and a description thereof will be omitted.

If the processes (especially, the processes in steps S1604 and S1606) are complete for all the trace target logs, the malware spread range list 5 changes from the state shown in FIG. 29 to that shown in FIG. 30. With this operation, when the row registered in the malware spread range list 5 in this flow is loaded in step S902 of FIG. 9, a forward trace is executed from there. That is, a spread destination by the shared folder is forward-traced. If the forward trace destination is also a shared folder, the processing of trace flow 2-B restarts, and thus it is possible to grasp the spread range by all the shared folders.

As described above, according to the first embodiment, the log trace unit 4 traces the PC operation logs 6 based on predetermined malware or the intrusion source of malware, and identifies an operation which spreads the malware. This can improve the identification accuracy of the spread range of the malware.

Second Embodiment

In the second embodiment, a technique for visually representing the spread range of malware will be described. In this embodiment, the arrangement of an identification apparatus for identifying the spread range of malware and the like are the same as in the first embodiment, unless otherwise specified.

For example, if a malware spread range list 5 includes information of a "PC name", it is possible to grasp a malware spread status in a PC name unit by integrating the rows of the malware spread range list in the PC name unit. Furthermore, it is possible to grasp information indicating how malware has been spread from a specific PC to another specific PC, by referring to the ID and parent ID of each row.

Figure 32:
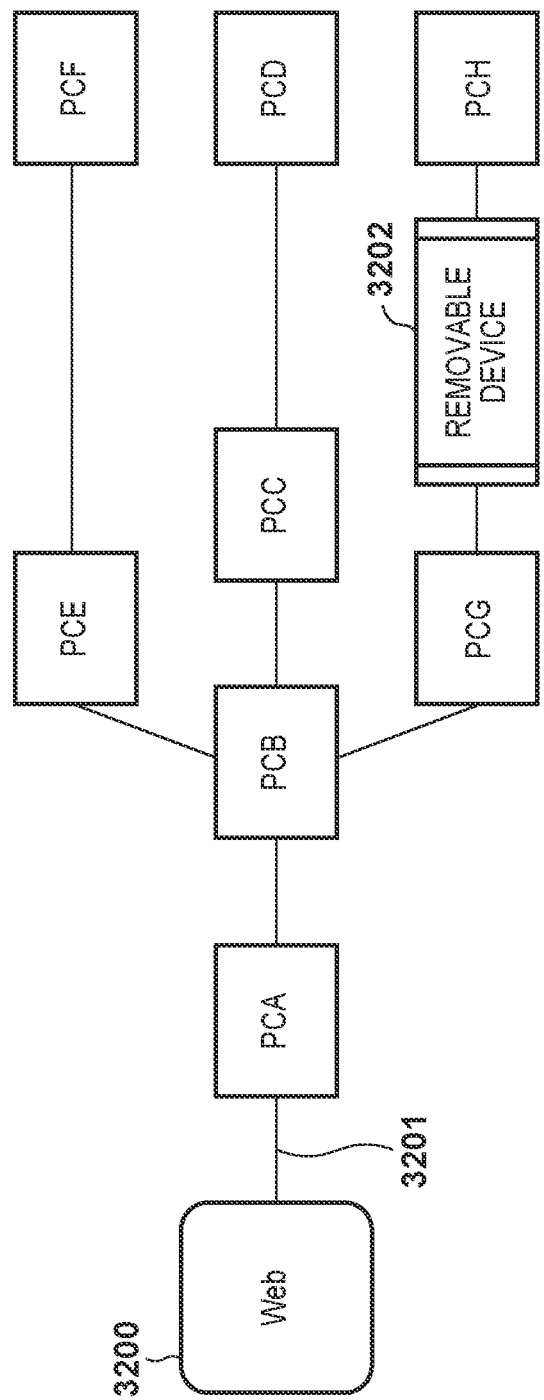
FIG. 32 is a view showing a visual representation of the malware spread range list shown in FIGS. 31A and 31B.

As an example, a malware spread range list shown in FIGS. 31A and 31B is generated. This indicates that malware has entered from a Web site "http://example.com", as a result of detecting the malware in PCD and performing a back trace. As a result of performing a forward trace based on the result of the back trace, it can be confirmed that the malware has been spread from PCB to PCE via a removable device and from PCB to PCG via a shared folder. It can also be confirmed that the malware has been spread from PCT to PCF via mail and from PCG to PCH via a removable device. FIG. 32 visually represents the information. The display of FIG. 32 is performed by, for example, a client PC 8 or a server 9.

Referring to FIG. 32, each node 3200 represents a point of intrusion, for example a terminal such as a PC, the Web, mail, or the like. The nodes 3200 are connected by connectors 3201, and represent a spread route. Furthermore, a medium 3202 may be displayed on the connector 3201. This can represent that the malware has been spread among the nodes 3200 via, for example, a shared folder and a removable device. FIG. 32 represents that the malware has been spread via a removable device between PCG and PCH.

As described above, according to the second embodiment, the client PC 8 or the server 9 performs display shown in FIG. 32. This makes it possible to readily grasp the point of intrusion and spread route of the malware, the number of terminals in which the malware may be hidden, and the like.

Other Embodiments

In the above-described first embodiment, a trace is performed using malware detection or a malware detection log as a trigger. However, for example, a trace may be performed based on information (for example, a path name, a URL, or the like) designated by the user or administrator. Registration of information in the malware spread range list 5 is not limited to automatic registration based on the results of a back trace and forward trace. The user or administrator may manually register information.

Furthermore, it is possible to disconnect a corresponding gateway including an infected range by identifying the spread range of malware. By disconnecting the corresponding gateway, it is possible to prevent secondary infection to an uninfected range (terminal). To prevent secondary infection to an uninfected range (terminal), the PC operation monitoring unit 1 may disable the use of a corresponding terminal or connection of the corresponding terminal to a network.

As described above, according to each of the above-described embodiments, there is provided an identification apparatus for identifying the spread range of malware. The identification apparatus for identifying a malware spread range may be provided in the client PC 8 or the server 9. If the identification apparatus is provided in the client PC 8, it is possible to identify the spread range even in a standalone environment. If the identification apparatus is provided in the server 9, it is possible to reduce the load of identification processing on the client PC 8.

The identification apparatuses may be respectively provided in both the client PC 8 and the server 9 connected to the client PC 8. The identification apparatus provided in the client PC 8 and that provided in the server 9 may identify the spread range of malware in cooperation with each other. This can distribute the load. Furthermore, operation histories stored in the client PC 8 can be reduced.

A program (for example, a program for causing a computer to function as the identification apparatus shown in FIG. 2) for implementing each of the above-described embodiments is incorporated in the scope of the present invention.

The present invention is not limited to the above embodiments and various changes and modifications can be made without departing from the spirit and scope of the present invention. Therefore, to apprise the public of the scope of the present invention, the following claims are made.

REFERENCE SIGNS LIST

1 . . . PC operation monitoring unit, 2 . . . log output unit, 3 . . . malware detection unit, 4 . . . log trace unit, 5 . . . malware spread range list, 6 . . . PC operation log, 7 . . . network, 8 . . . client PC, 9 . . . server

What is claimed is:

1. An identification apparatus for identifying a spread range of malware, the spread range being a set of media to which the malware has been spread, comprising:
at least one memory that stores instructions and stores an operation history as a history of an operation executed in at least one information processing apparatus; and
at least one processor that, upon executing the instructions, functions as
an acquisition unit configured to acquire malware spread information including information indicating malware; and
an identification unit configured to
identify, based on the operation history, an intrusion route of the malware indicated by the malware spread information acquired by the acquisition unit,
generate at least one piece of malware spread information corresponding to at least one operation included in the intrusion route in the operation history, and
identify the spread range of the malware by, for each of the at least one piece of malware spread information, identifying at least one operation of spreading the malware in the operation history by setting, as a direct or indirect start point, the malware indicated by the malware spread information.

2. The identification apparatus according to claim 1, wherein
the malware spread information further includes cause information indicating a cause of one of spread and intrusion of the malware, and
the identification unit identifies the at least one operation by processing based on the cause information.

3. The identification apparatus according to claim 2, wherein
if the cause information indicates that the malware has been spread due to a file, the identification unit identifies, in the operation history, an operation for at least one of file creation, file change, registry creation, registry change, and access to a shared memory by a process generated by executing the malware indicated by the malware spread information.

4. The identification apparatus according to claim 2, wherein
if the cause information indicates that the malware has been spread due to the file, the identification unit identifies, in the operation history, an operation for at least one of file creation, file change, registry creation, registry change, and access to a shared memory by one of a process activated by the process generated by executing the malware indicated by the malware spread information and a process which has loaded the malware indicated by the malware spread information.

5. The identification apparatus according to claim 2, wherein
if the cause information indicates that the malware has been spread due to the file, the identification unit identifies, in the operation history, an operation for at least one of a copy, movement, and rename of the malware indicated by the malware spread information.

6. The identification apparatus according to claim 2, wherein
if the cause information indicates that the malware has entered due to Web access, the identification unit identifies, in the operation history, an operation for at least one of file creation and file overwrite, which has been performed by a process that has accessed a URL of an intrusion source indicated by the malware spread information between access to the URL of the intrusion source and access to another URL.

7. The identification apparatus according to claim 2, wherein
if the cause information indicates that the malware has entered due to mail reception, the identification unit identifies, in the operation history, an operation for at least one of file creation and file overwrite by a process which has received mail from a mail address of an intrusion source indicated by the malware spread information.

8. The identification apparatus according to claim 2, wherein
if the cause information indicates that the malware has been spread due to a removable device, the identification unit identifies, in the operation history, an operation for at least one of a copy, movement, and rename of a file from the removable device of an intrusion source indicated by the malware spread information.

9. The identification apparatus according to claim 2, wherein
if the cause information indicates that the malware has been spread due to a shared folder, the identification unit identifies, in the operation history, an operation for at least one of a copy, movement, and rename of a file from the shared folder of an intrusion source indicated by the malware spread information.

10. The identification apparatus according to claim 1, wherein
the identification unit generates at least one piece of malware spread information corresponding to at least one operation identified based on the malware spread information acquired by the acquisition unit.

11. The identification apparatus according to claim 1, wherein, upon executing the instructions, the at least one processor further functions as:
a detection unit configured to detect malware,
wherein the acquisition unit acquires malware spread information corresponding to the malware detected by the detection unit.

12. The identification apparatus according to claim 1, wherein
the acquisition unit acquires malware spread information input by a user.

13. A control method for an identification apparatus for identifying a spread range of malware, the spread range being a set of media to which the malware has been spread, comprising:
storing an operation history as a history of an operation executed in at least one information processing apparatus;
acquiring malware spread information including information indicating malware; and
identifying, based on the operation history, an intrusion route of the malware indicated by the malware spread information acquired in the acquiring,
generating at least one piece of malware spread information corresponding to at least one operation included in the intrusion route in the operation history, and
identifying the spread range of the malware by, for each of the at least one piece of malware spread information, identifying at least one operation of spreading the malware in the operation history by setting, as a direct or indirect start point, the malware indicated by the malware spread information.

14. A non-transitory computer-readable storage medium which stores a program for causing a computer to execute a control method for identifying a spread range of malware, the spread range being a set of media to which the malware has been spread, the method comprising:
storing an operation history as a history of an operation executed in at least one information processing apparatus;
acquiring malware spread information including information indicating malware; and
identifying, based on the operation history, an intrusion route of the malware indicated by the malware spread information acquired in the acquiring,
generating at least one piece of malware spread information corresponding to at least one operation included in the intrusion route in the operation history, and
identifying the spread range of the malware by, for each of the at least one piece of malware spread information, identifying at least one operation of spreading the malware in the operation history by setting, as a direct or indirect start point, the malware indicated by the malware spread information.

15. The identification apparatus according to claim 1, wherein the set of media includes information about one or more types of media including computers, files, registries, shared memories, and removable storage devices.

\* \* \* \* \*